US010247875B2

(12) United States Patent
Itoi et al.

(10) Patent No.: US 10,247,875 B2
(45) Date of Patent: Apr. 2, 2019

(54) BACKLIGHT UNIT AND LIQUID CRYSTAL DISPLAY DEVICE

(71) Applicant: NICHIA CORPORATION, Anan-shi (JP)

(72) Inventors: Hiroto Itoi, Anan (JP); Ryosuke Wakaki, Tokushima (JP); Ken Katsuragi, Anan (JP); Yusaku Achi, Tokushima (JP); Shingo Masui, Tokushima (JP)

(73) Assignee: NICHIA CORPORATION, Anan-shi (JP)

( * ) Notice: Subject to any disclaimer, the term of this patent is extended or adjusted under 35 U.S.C. 154(b) by 0 days.

(21) Appl. No.: 15/974,630

(22) Filed: May 8, 2018

(65) Prior Publication Data
US 2018/0259703 A1 Sep. 13, 2018

Related U.S. Application Data

(62) Division of application No. 14/865,071, filed on Sep. 25, 2015, now Pat. No. 9,995,870.

(30) Foreign Application Priority Data

Sep. 26, 2014 (JP) .................................. 2014-197104

(51) Int. Cl.
*F21V 8/00* (2006.01)
*F21K 99/00* (2016.01)
(52) U.S. Cl.
CPC ......... *G02B 6/0073* (2013.01); *G02B 6/0023* (2013.01); *G02B 6/0068* (2013.01)
(58) Field of Classification Search
CPC .. G02B 6/0091; G02B 6/0026; G02B 6/0025; G02B 6/0023; G02B 6/0068; G02B 6/0073
See application file for complete search history.

(56) References Cited

U.S. PATENT DOCUMENTS 7,431,463 B2 * 10/2008 Beeson ................. G03B 21/28
348/742
9,618,687 B2 4/2017 Ohkawa
(Continued)

FOREIGN PATENT DOCUMENTS

JP 2003-242817 8/2003
JP 2006-202703 8/2006
(Continued)

OTHER PUBLICATIONS

ITU-R BT.2020-1, "Parameter values for ultra-high definition television systems for production and international programme exchange", ITU, Jun. 2014.
(Continued)

*Primary Examiner* — Jong-Suk (James) Lee
*Assistant Examiner* — Eric T. Eide
(74) *Attorney, Agent, or Firm* — Mori & Ward, LLP

(57) ABSTRACT

A backlight unit has a light-guide plate and a light source optically coupled with the light-guide plate, with which light is input from a plane of the light-guide plate and white-light is output from the first principal plane of the light-guide plate. The light source has a plurality of blue light emitting diodes, red phosphor material excited by light from the blue light emitting diodes and emits red light, and a plurality of green semiconductor lasers having emission peaks at green light wavelengths. The red phosphor material is included in a phosphor sheet, and the phosphor sheet is disposed on a surface of the light-guide plate.

6 Claims, 18 Drawing Sheets

(56) References Cited

U.S. PATENT DOCUMENTS

| | | |
|---|---|---|
| 9,753,214 B2 | 9/2017 | Shin et al. |
| 2006/0072339 A1* | 4/2006 | Li .................. G02B 6/0013 362/608 |
| 2010/0014022 A1 | 1/2010 | Nagata et al. |
| 2010/0053939 A1 | 3/2010 | Fan et al. |
| 2010/0053996 A1 | 3/2010 | Zhang et al. |
| 2013/0033901 A1 | 2/2013 | Nishitani et al. |
| 2013/0107573 A1 | 5/2013 | Kadomi et al. |
| 2013/0271042 A1 | 10/2013 | Kim |
| 2013/0322114 A1 | 12/2013 | Nishitani et al. |
| 2014/0009961 A1 | 1/2014 | Sakaguchi et al. |
| 2014/0340931 A1 | 11/2014 | Nishitani et al. |
| 2015/0023055 A1 | 1/2015 | Hwang et al. |
| 2016/0014384 A1 | 1/2016 | Hosoki |
| 2016/0091655 A1 | 3/2016 | Achi et al. |
| 2017/0082789 A1 | 3/2017 | Yasunaga et al. |

FOREIGN PATENT DOCUMENTS

| | | |
|---|---|---|
| JP | 2008-117879 | 5/2008 |
| JP | 2008-270145 | 11/2008 |
| JP | 2009-087570 | 4/2009 |
| JP | 2010-056089 | 3/2010 |
| JP | 2011-503774 | 1/2011 |
| JP | 2011-171365 | 9/2011 |
| JP | 2012-238462 | 12/2012 |
| JP | 2013-258121 | 12/2013 |
| JP | 2014-164834 | 9/2014 |
| WO | WO 2008/114535 | 9/2008 |
| WO | WO 2009/055070 | 4/2009 |
| WO | WO 2011/129117 | 10/2011 |
| WO | WO 2012/026206 | 3/2012 |
| WO | WO 2012/111190 | 8/2012 |
| WO | WO 2012/132895 | 10/2012 |
| WO | WO 2013/038633 | 3/2013 |
| WO | WO 2014/141879 | 9/2014 |

OTHER PUBLICATIONS

Notice of Allowance with Form PTO-892 Notice of References Cited issued by the United States Patent and Trademark Office for the parent U.S. Appl. No. 14/865,071, dated Feb. 9, 2018.

\* cited by examiner

BACKLIGHT UNIT AND LIQUID CRYSTAL DISPLAY DEVICE

CROSS-REFERENCE TO RELATED APPLICATIONS

The present application is a divisional application of the U.S. patent application Ser. No. 14/865,071 filed Sep. 25, 2015, which claims priority under 35 U.S.C. 119 to Japanese Patent Application No. 2014-197104 filed Sep. 26, 2014. The contents of these applications are incorporated herein by reference in their entirety.

BACKGROUND OF THE INVENTION

1. Field of the Invention

The present disclosure relates to backlight unit as a light source for a liquid crystal display device and to a liquid crystal display device using that backlight unit.

2. Description of the Related Art

Liquid crystal technology is applied extensively in displays such as large-screen televisions. A LED used for backlight in such liquid crystal displays that produces white-light is configured by combining blue LEDs, which emit blue light, and yttrium-aluminum-garnet ($Y_3Al_5O_{12}$: YAG) phosphor, which emits yellow light when excited by blue light from the LEDs, for example.

In recent years, as shown in FIG. 26, the region of color-space on a chromaticity diagram required by new display standards is wider than that for conventional standard.

Refer to Japanese Laid-Open Patent Publication 2003-242817, International Patent Publication WO2012/132895, and BT.2020 "Parameter values for ultra-high definition television systems for production and international programme exchange" (ITU 2014.6).

One object of the present invention is to provide a backlight unit for a liquid crystal display and a liquid crystal display device that can implement a wider range of colors than that specified by the NTSC standard.

SUMMARY OF THE INVENTION

A backlight unit for one aspect of the present invention is provided with a light-guide plate a light-guide plate having a first principal plane, a second principal plane at opposite side of the first principal plane, and at least one edge; and a light source optically coupled with the light-guide plate, with which light is input from a plane of the light-guide plate and white-light is output from the first principal plane of the light-guide plate. The light source has a plurality of blue light emitting diodes; red phosphor material excited by light from the blue light emitting diodes and emits red light; and a plurality of green semiconductor lasers having emission peaks at green light wavelengths. The red phosphor material is included in a phosphor sheet, and the phosphor sheet is disposed on a surface of the light-guide plate.

The liquid crystal display device for another aspect of the present invention uses the liquid crystal display backlight unit described above as backlighting.

BRIEF DESCRIPTION OF THE DRAWINGS

More complete appreciation of the invention and many of its attendant advantages will be readily obtained as the invention becomes better understood by reference to the subsequent detailed description considered in conjunction with the accompanying drawings.

DETAILED DESCRIPTION OF THE EMBODIMENTS

Figure 1:
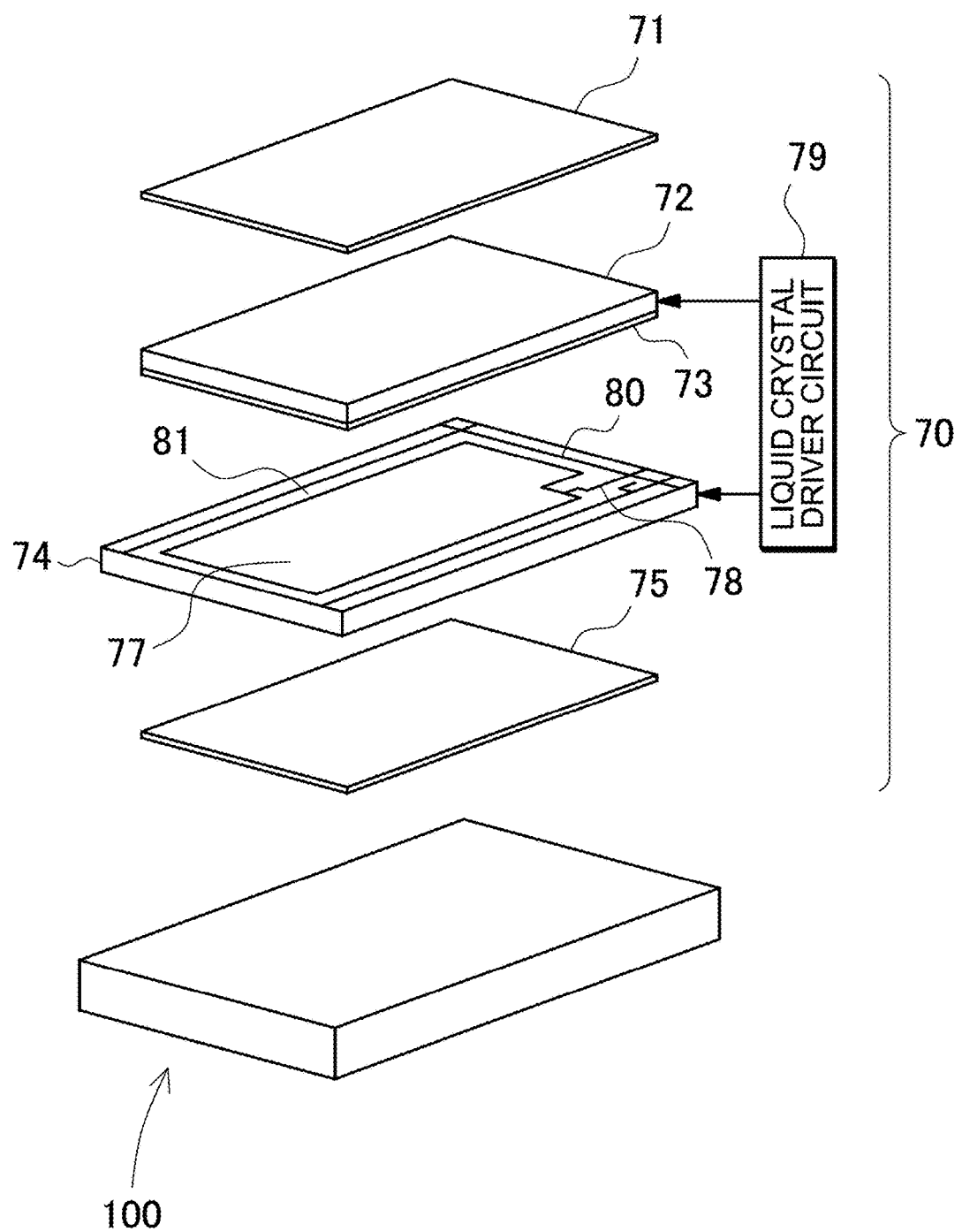
FIG. 1 is an exploded schematic perspective view showing a liquid crystal display device for one embodiment.

The following describes embodiments of the present invention with reference to the accompanying drawings. Here, similar reference numbers designate corresponding or identical components in the drawings. However, the following embodiments are merely specific examples representative of the technology associated with the present invention, and the present invention is not limited to the embodiments described below. In this application, components indicated in the claims are in no way limited to the components in the embodiments. Particularly, in the absence of specific annotation, structural component features described in the embodiments such as dimensions, raw material, shape, and relative position are simply for the purpose of explicative example and are not intended to limit the scope of the invention. Properties such as the size and spatial relation of components shown in the figures may be exaggerated for the purpose of clear explanation. In the descriptions following, components with the same name and reference number indicate components that are the same or have the same properties and their detailed description is appropriately abbreviated. Further, a single component can serve multiple functions and a plurality of structural elements of the invention can be implemented with the same component. In contrast, the functions of a single component can be separated or distributed and implemented by a plurality of components.

In this disclosure, the relation between color designation and chromaticity diagram coordinates, and the relation between the color designation of single-color light and the wavelength range of that light are in accordance with Japanese Industrial Standard (JIS) Z8110. Specifically, blue-purple is 380 nm to 455 nm, blue is 455 nm to 485 nm, blue-green is 485 nm to 495 nm, green is 495 nm to 548 nm, yellow-green is 548 nm to 573 nm, yellow is 573 nm to 584 nm, yellow-red is 584 nm to 610 nm, and red is 610 nm to 780 nm.

(Liquid Crystal Display Device)

As shown in FIG. 1, an example of a liquid crystal display (LCD) device is shown as one implementation of the present disclosure. Here, a backlight unit 100 is stacked at the bottom surface of the LCD panel 70. In detail from the top to bottom of FIG. 1, polarizing film 71, glass substrate 72, common electrode layer 73, glass substrate 74, polarizing film 75, and the backlight unit 100 are stacked in that order. In addition, a matrix of pixel electrodes 77, which correspond to each display element (liquid crystal cell or pixel), are formed on the surface of the glass substrate 74 opposite the common electrode layer 73. Each pixel electrode 77 is controlled ON or OFF by a thin film transistor (TFT) 78, and each TFT 78 is turned by a liquid crystal driver circuit 79 which can selectively control ON or OFF of signal lines 81 and scanning lines 80. Although not illustrated, an alignment layer (liquid crystal orientation film) is disposed on the upper surface of the pixel electrodes 77, another alignment layer is disposed on the bottom surface of the common electrode layer 73, and liquid crystal material fills the gap between those two alignment layers. The polarizing film 71, glass substrate 72, common electrode layer 73, glass substrate 74, and polarizing film 75 described above all have substantially the same dimensions.

First Embodiment (Backlight Unit 100)

Figure 2:
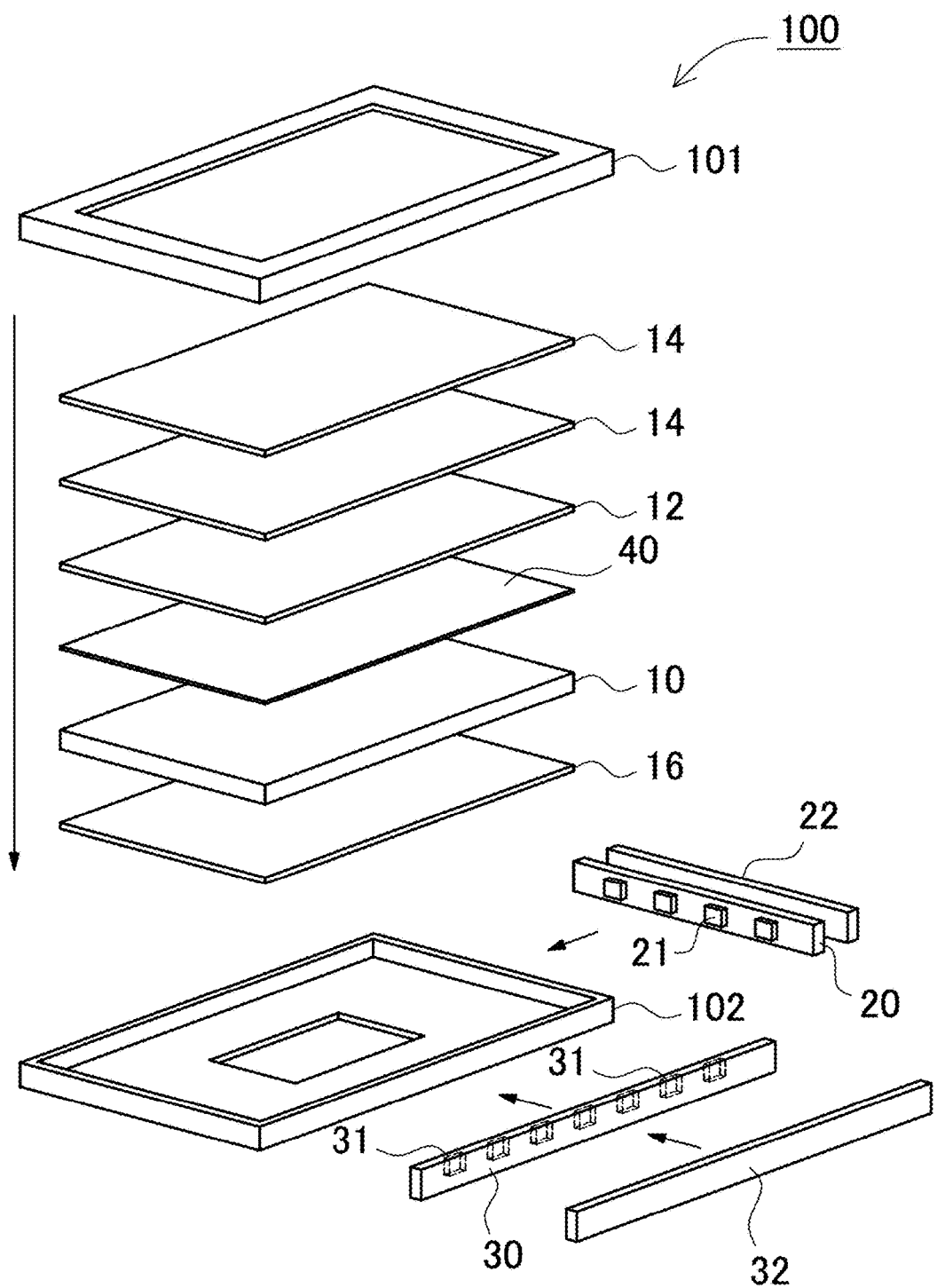
FIG. 2 is an exploded schematic perspective view showing a liquid crystal display backlight unit of the first embodiment.

Details of the backlight unit 100 for the first embodiment of the present invention are shown in the exploded schematic perspective view of FIG. 2. The liquid crystal display backlight unit shown in FIG. 2 is provided with a front-frame 101 and back-frame 102 that constitute a housing of the backlight unit, a light-guide plate 10 housed between the front and back-frames, a blue LED unit 20 that carries a plurality of blue LEDs 21, and a green laser diode unit 30 that carries a plurality of green laser diodes (LDs) 31. In the following, LEDs may be referred to as light emitting diodes or light emitting devices with the same meaning intended, and LDs may be referred to as laser diodes, laser diode devices, or semiconductor lasers, also with the same meaning intended. An LED or LD element may also be referred to as a die or chip. A diffuser sheet 12 to uniformly diffuse light and a lens sheet 14 such as a prism sheet to direct the light are disposed on the upper surface of the light-guide plate 10. Preferably, the lens sheet 14 employs a double-layer of lens sheets 14. In addition, a reflector sheet 16 is disposed under the bottom surface of the light-guide plate 10 to effectively utilize light by reflecting it at the bottom surface of the light-guide plate 10. Preferably by making these sheets or layers substantially the same size and shape, they can be neatly housed between the front-frame 101 and the back-frame 102, which divide the frame into upper and lower pieces. Omission of the diffuser sheet is also possible.

Figure 3:
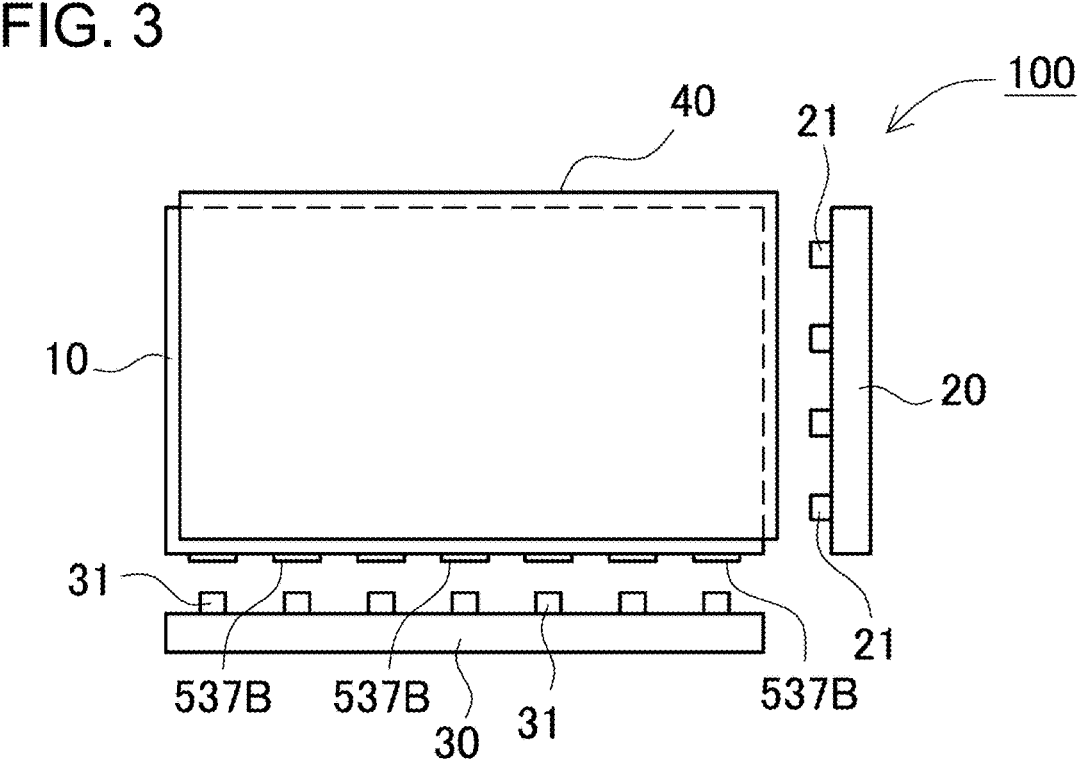
FIG. 3 is a schematic plan view showing light source and light-guide plate arrangement of the first embodiment.

An arrangement of light sources and the light-guide plate 10 of the backlight unit 100 is shown in the schematic plan view of FIG. 3. As shown in FIG. 3, a blue LED unit 20 is disposed along the first edge, which is one edge of the light-guide plate 10, and a green laser diode (LD) unit 30 is disposed along the second edge, which is another edge of the light-guide plate 10. The surface of the blue LED unit 20 opposite the first edge of the light-guide plate 10 has a plurality of blue LED devices 21 spaced at approximately equal intervals. Further, a phosphor sheet 40 is disposed on the first principal plane of the light-guide plate 10. The phosphor sheet 40 includes dispersed red phosphor material that emits red light when excited by blue light emitted from the blue LEDs 21. In this manner, that is, by disposing light sources around the perimeter of the light-guide plate 10 to introduce different colored light from different surfaces (or edges), and by disposing the phosphor sheet 40 dispersed with red phosphor material on the first principal plane of the light-guide plate 10, white-light that these colored light are mixed can be output from the first principal plane, which is the light-extraction surface of the light-guide plate 10. Further, the first principal plane, which is the light-extraction surface of the light-guide plate 10, can serve as a planar light source by emitting light that is substantially uniform over the entire first principal plane.

It is preferable to dispose the red phosphor material further away from the green LD devices than from the blue LED devices. By disposing the red phosphor material at a distance from a large amount of heat producing green LD devices, thermally induced degradation of the phosphor can be reduced. This arrangement is particularly effective in the case where phosphor material having a low resistance to thermal degradation such as $K_2SiF_6$ (KSF) is used as the red phosphor material (described later).

(Blue LED Unit 20)

A blue LED unit 20 carrying a plurality of blue LED devices 21 in a linear arrangement is disposed along the first edge of the light-guide plate 10, which is at one end of the lengthwise side of the light-guide plate 10 in the embodiment of FIG. 3, so that optically connected to the light-guide plate 10. A light from the blue LED unit 20 incidents into the light-guide plate 10 from an edge of the light-guide plate 10 and the light is extracted from the light-extraction surface or viewing surface of the light-guide plate 10 served as a planer light source. Such configuration may be referred as edge-lighting type in this specification.

The blue LED unit 20 of this embodiment is a long narrow circuit board with blue LED devices 21 mounted at approximately equal intervals. The blue LED devices 21 are powered via an LED driver circuit 22.

(Blue LED Device 21)

Figure 4:
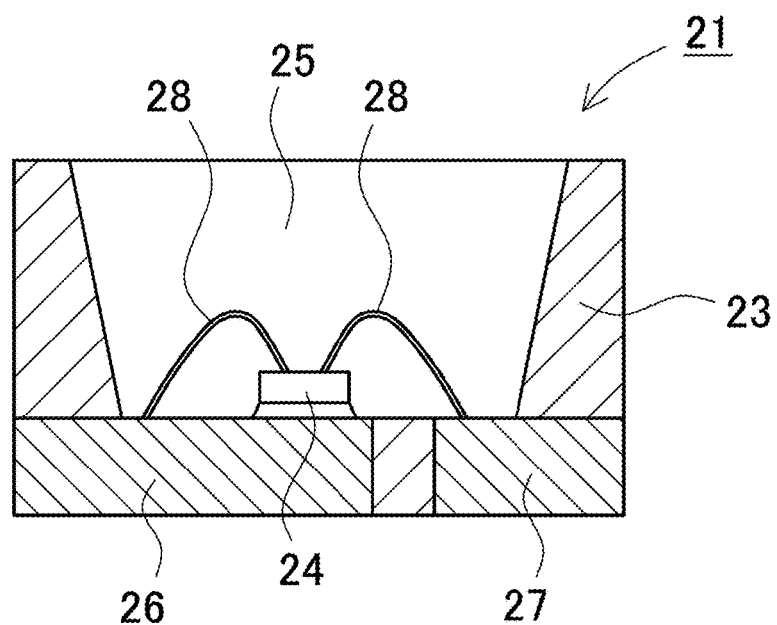
FIG. 4 is a schematic cross-sectional view showing one of the blue LEDs in FIG. 3.

Various types of LED devices, such as lamp-type devices and surface-mount devices can be used as blue LED devices 21 in the blue LED unit 20. A lamp-type LED device generally implies a light emitting device configured with the light emitting element disposed on the lead-frame of externally connecting electrode leads and enclosed in encapsulating material. The encapsulating material covers the light emitting element and part of the leads and is formed in a bullet or dome shape, for example. A surface-mount LED device implies a light emitting device configured with the light emitting element and encapsulating material disposed on a molded body, for example. There are also light emitting devices with the light emitting element mounted on a planar substrate covered with encapsulating material that includes phosphor and is formed in a lens shape. Surface-mount devices as shown in the schematic cross-sectional view of FIG. 4 are used as the blue LEDs for the present embodiment. Surface-mount type devices (SMDs) are appropriate for use in thin, compact apparatus.

The blue LED device 21 shown in FIG. 4 is mainly made up of a package 23 that has a recess, an LED die (chip) 24, and encapsulating material 25 that covers the LED die 24. The LED die 24 includes a gallium nitride based semiconductor that is capable to emit visible light at short wavelengths. The package 23 is formed with a recess that has side-walls and a bottom surface. The LED die 24 is disposed on the bottom surface of the recess. The package 23 has a pair of electrode leads 26, 27 (positive and negative electrode leads) and is molded as a single-piece with thermoplastic or thermosetting resin. The positive and negative electrode leads 26, 27 integral with the package 23 are electrically connected via conducting wires 28 to the LED die 24. The inside of the recess is filled with encapsulating material 25. The encapsulating material 25 preferably employs a thermosetting resin such as epoxy resin, silicone resin, epoxy-modified silicone resin, or modified silicone resin. The positive and negative electrode leads 26, 27 are exposed on the bottom surface of the package 23 and aligns with the bottom surfaces of the package outline. Power is received from an external supply through the electrode leads 26, 27 to turn on or illuminate the blue LED device 21.

The blue LED device 21 has a light emission peak in a wavelength range of 430 nm to 490 nm, and preferably with a wavelength near 467 nm. By using a blue LED device 21 with a sharp-peak emission spectrum, extension of the tail regions (the end portions) of the emission wavelength into the green wavelengths region can be avoided, a range (band) of wavelengths cut by a green filter can be narrowed, and light transmissivity of the filter can be improved. The blue LED device 21 can have the generic formula $In_xAl_yGa_{1-x-y}N$, ($0 \leq x \leq 1$, $0 \leq y \leq 1$, $0 \leq x+y \leq 1$), and higher emission intensity can be obtained with a multi-layer structure.

To form an n-type nitride semiconductor with improved light emission efficiency, inclusion of dopants such as Si, Ge, Se, Te, C, and O is preferable. P-type nitride semiconductors can be formed by doping with elements such as Zn, Mg, Be, Ca, Sr, and Ba. In the case of nitride semiconductors, simply including p-type dopant may not work to convert the material to p-type. Accordingly, post-doping heat treatment or plasma exposure is preferably performed to reduce the resistance of the p-type material.

There are no particular limitations on the LED element as long as it is configured to emit light from an upper or side surface. A pair of (positive and negative) electrodes can be provided on a single surface or on two opposite surfaces of the semiconductor element stack, which is a multi-layer stack.

(LED Driver Circuit 22)

The blue LED unit 20 is connected to an LED driver circuit 22 to illuminate each LED element (chip). The LED driver circuit 22 controls illumination of each LED to produce uniform white-light across the light-extraction surface of the light-guide plate 10. The output from the LEDs is controlled by schemes such as pulse width modulation (PWM) or pulse amplitude modulation (PAM). A current regulating system can be provided to compensate for variation in the light emitting characteristics of individual LEDs. Other regulating circuitry, such as circuits that sense ambient brightness and adjust LED output appropriately, may also be added.

(Red Phosphor Material)

Phosphor material with an emission wavelength that the peak emission wavelength lies within the range of red filter wavelengths (described later in the color filter section) and has a narrow full width at half-maximum (FWHM), is efficient and preferable for use as the red phosphor material. In this example, fluoride phosphor material is used as the red phosphor. Specifically, the red phosphor of the present embodiment is a fluoride phosphor material activated by $Mn^{4+}$ with the following formula.

$$A[M_{1-a}Mn^{4+}{}_aF_6] \qquad (1)$$

In formula (1), component A is selected from the group of elements: Li, Na, K, Rb, and Cs, includes at least one of those alkaline earth metals, and includes at least Na and/or K. Component M is at least one element selected from the group 4 and group 14 elements, and a is a number satisfying the inequality $0<a<0.2$. Preferably, $K_2SiF_6:Mn^{4+}$ (KSF) phosphor is used as the red phosphor. By using KSF phosphor, green light is not absorbed by the phosphor even when the phosphor is exposed to green light from the green laser diodes 31. This enables efficient realization of the three light components red, green, and blue (RGB) even when the phosphor is disposed as a phosphor sheet 40 on the front surface (the first principal plane) of the light-guide plate 10.

The red phosphor is not limited to a single type of phosphor material, and two or more types of phosphor material can be used together. It is preferable to incorporate the red phosphor material in a light transmissive resin as a phosphor sheet 40, which is disposed on the front or back surface (the second principal plane) of the light-guide plate 10. It is especially preferable to dispose the phosphor sheet 40 on the front surface of the light-guide plate 10 making it easy to provide separation between the red phosphor material and the blue LED unit 20. In particular, in the case where the phosphor sheet includes KSF phosphor degradation of the KSF phosphor by heat can prevent or suppress by disposing the phosphor sheet at a distance from the blue LEDs.

Additionally, the phosphor sheet 40 disposed in this manner on the front surface of the light-guide plate 10 also serves to scatter light from the laser diodes 31, and is preferable from a light uniformity perspective. In particular, since laser light is highly directional, light scattering is essential. While light from the green laser diodes 31 is emitted into and scattered by the light-guide plate 10, further light scattering by phosphor particles within the phosphor sheet acts in synergy to produce even more uniform light immediately prior to output of RGB light. Further, in this or in any of the embodiments, surfaces of the phosphor sheet 40 can be formed with prism-like shaped protrusion and recess to scatter light to a still higher degree.

Figure 5:
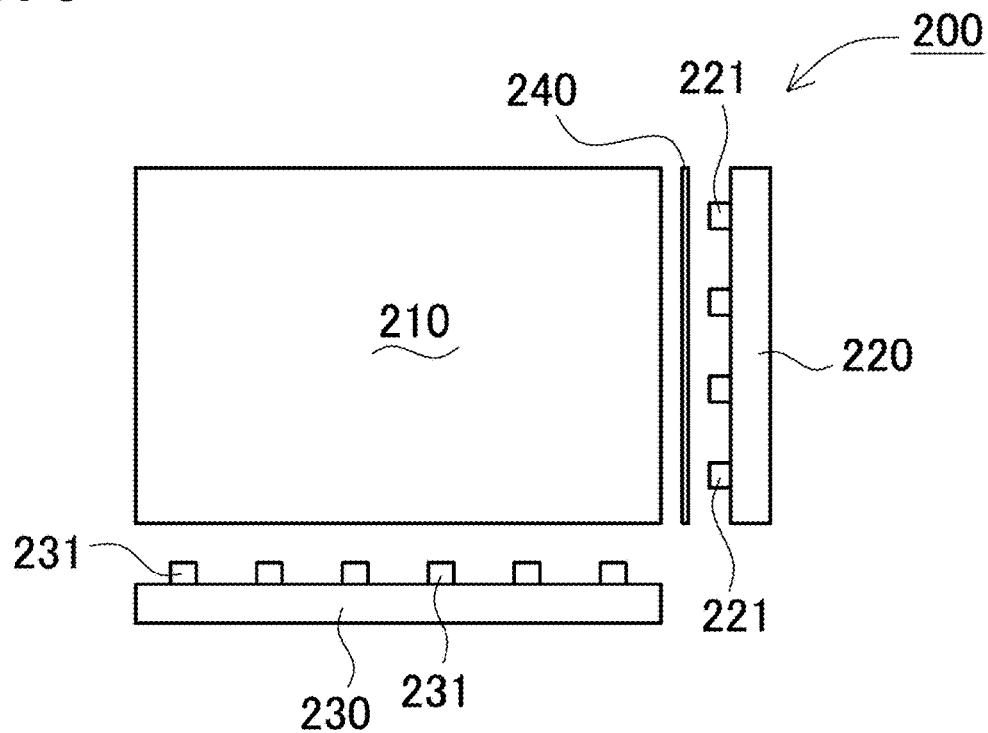
FIG. 5 is a schematic plan view showing a disposition of the red phosphor in an alternate embodiment.

As shown in the alternate embodiment backlight unit 200 of FIG. 5, the phosphor sheet 240 can be positioned between the blue LED unit 220 and the light-guide plate 210. Namely, the backlight unit 200 can be configured with the phosphor sheet 240 disposed at an edge of the light-guide plate 210. The red phosphor material can be disposed at any surfaces where the phosphor can be efficiently illuminated by blue LED light. For example, in the case where the blue LED unit 220 is disposed at an edge of the light-guide plate 210, a coating includes the red phosphor or a phosphor sheet 240 that includes the red phosphor can be provided between the blue LED unit 220 and the light-guide plate 210 to introduce red fluorescent light produced by efficient excitation of the red phosphor. The green laser diode unit 230 in this embodiment, which carries green laser diode devices 231, can be configured in substantially the same manner shown in FIG. 3. Such as this configuration, that is, the red phosphor, which is excited by blue LED light, is disposed at the same surface of light-guide plate 210 as the blue LED devices 221 are disposed, while the green laser diode devices 231, which produce more heat than the blue LED devices 221, are disposed at a different surface of the light-guide plate 210 allows separation between the red phosphor material and the blue LED devices 221 with respect to the green laser diode devices 231. Further, since no phosphor sheet intervenes between the green laser diodes and the light-guide plate, degradation of the red phosphor material and the blue LED devices 221 due to heat produced by the green laser diode devices 231 can be suppressed.

Figure 6:
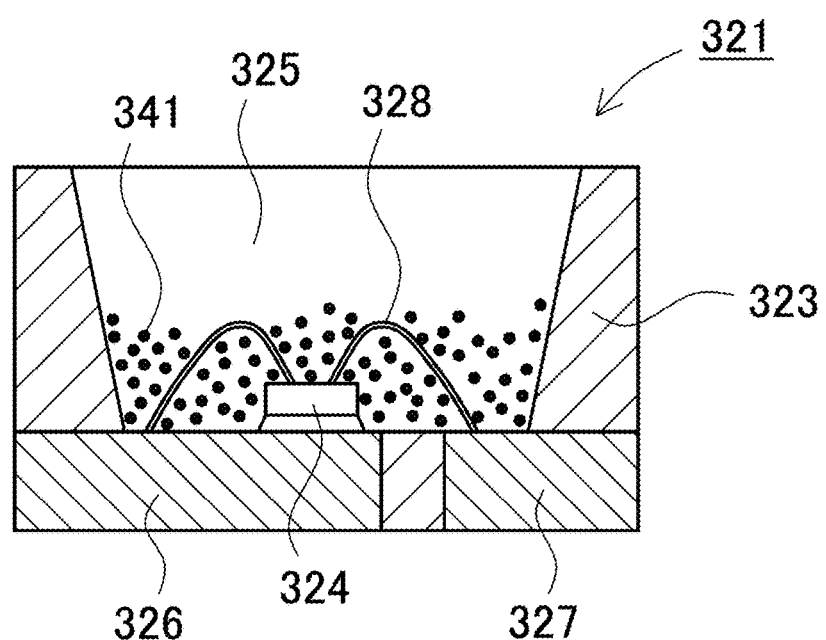
FIG. 6 is a schematic cross-sectional view showing an arrangement of the red phosphor arrangement in a blue LED of an alternate embodiment.

The red phosphor may not be included in a phosphor sheet. For example, as shown in the alternate embodiment of blue LED device 321 of FIG. 6, red phosphor material 341 can be disposed in the package 323 and around the LED die 324. Integrating the red phosphor material 341 into the package 323 of the blue LED device 321 has the merit that additional space may not be needed to be allocated for disposing the red phosphor and assembly for a backlight unit can be simplified. In the embodiment of FIG. 6, the red phosphor material 341 is distributed with local bias within the encapsulating material 325. By providing red phosphor close to the LED die 324, light from the LED die 324 can be efficiently converted, and a light emitting device with superior emission efficiency can be produced. Disposition of material including the red phosphor is not limited to close proximity with the light emitting element, and considering the effects of heat on the phosphor material, distance can be established between the light emitting element and the wavelength-shifting material that includes the phosphor. Further, by distributing the red phosphor material approximately uniformly throughout the encapsulating material, light without color unevenness can be produced.

Figure 7:
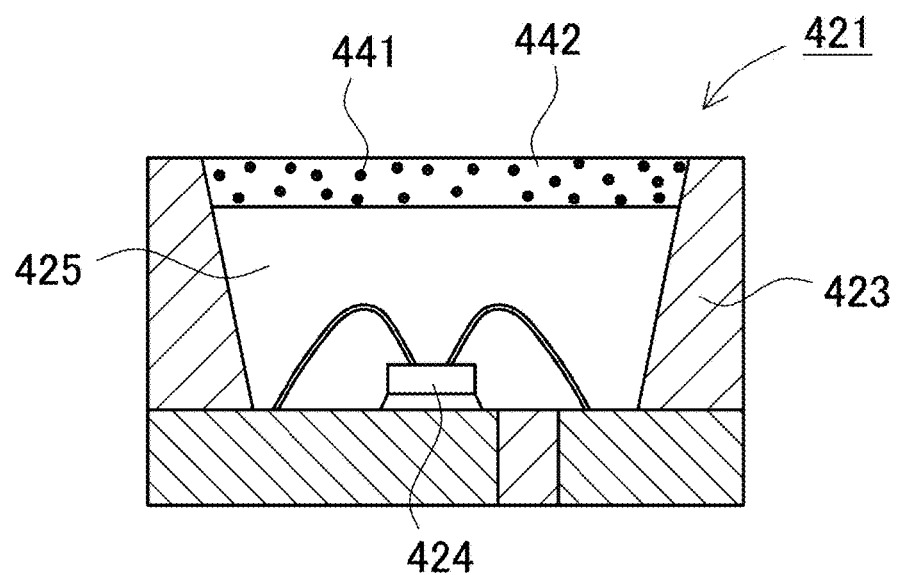
FIG. 7 is a schematic cross-sectional view showing an arrangement of the red phosphor in a blue LED of another alternate embodiment.

In the structure shown in FIG. 6, red phosphor material may be directly exposed to intense light and heat generated by the LED chip. Therefore, characteristics alteration or degradation of phosphor material may cause, particularly for phosphors characterized by temperature sensitivity or low resistance to heat. Accordingly, as shown in the blue LED device 421 of FIG. 7, red phosphor material 441 can be included in a second encapsulating material 442 layer disposed on the upper surface of encapsulating material 425 that partially fills the recess of the package 423. This establishes distance between the LED die 424 and the red phosphor material 441 and can protect the red phosphor material 441 from light and heat generated by the LED die 424.

In case where a plurality types of red phosphors are employed, besides mixing the different types of red phosphor material together, the different types of red phosphor material can be disposed in different locations as well. For example, when two types of red phosphor material (i.e. a first red phosphor and a second red phosphor) are employed, the first red phosphor can be mixed into the encapsulating resin of the blue LED devices while the second red phosphor can be stacked on the light-guide plate as a phosphor sheet. In particular, phosphor with low resistance to heat such as KSF can be disposed in the form of phosphor sheet, which is advantageously employed at a distance from the sources of heat. In contrast, phosphor with superior heat resistance can be encapsulated inside the blue LED device. It is possible to combine different allocating arrangements and dispose phosphor material to take advantage of each phosphor's individual characteristics.

(Green Laser Diode Unit 30)

As shown in figures such as FIG. 2, the green laser diode (LD) unit 30 carries a plurality of green laser diode (LD) devices 31 mounted at approximately equal intervals, and is disposed opposite the second edge, which is adjacent to the first edge of the light-guide plate 10. The green LD devices 31 are illuminated via an LD driver circuit 32. This configuration disposes the green LD devices 31, which have greater thermal emission than the blue LED devices 21, at a different edge (second edge) of the light-guide plate 10 than the blue LED devices 21 (disposed at the first edge) and the phosphor sheet 40, which includes red phosphor material and is disposed on the first principal plane of the light-guide plate 10. This separates the green LD devices 31 from both the blue LED devices 21 and the red phosphor material, and can suppress degradation of the red phosphor material and blue LED devices 21 due to heat produced by the green LD devices 31.

Figure 8:
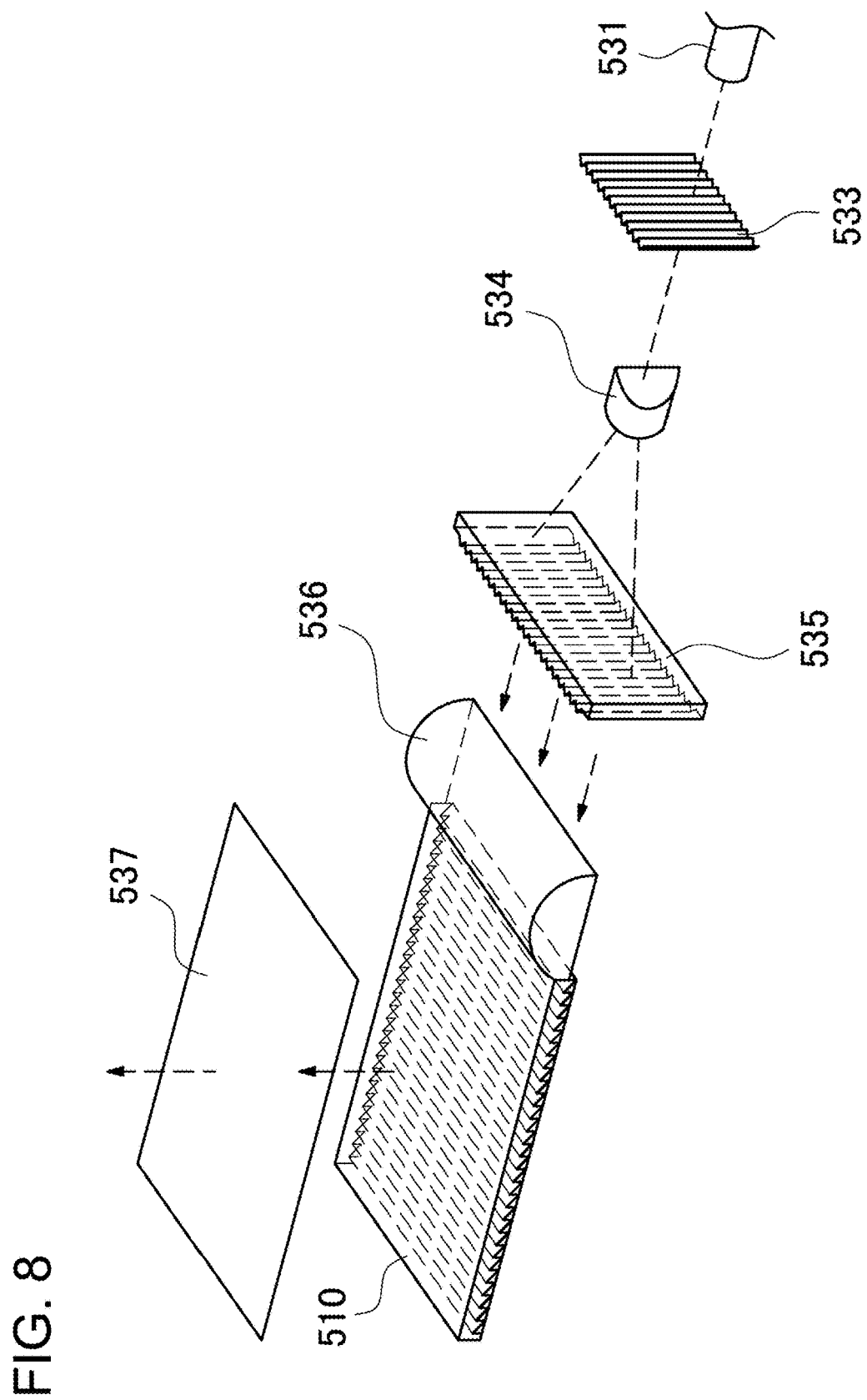
FIG. 8 is an exploded schematic perspective view showing one embodiment of a configuration to implement backlighting with a green laser disposed at an edge of the light-guide plate.

One example of a configuration that implements backlighting with a green LD unit 30 disposed at an edge of the light-guide plate 10 is shown in the exploded schematic perspective view of FIG. 8. As shown in this figure, the green LD device emits green light into the light-guide plate 510 through various optical components. Here, a polarizer 533, a laser line generator lens 534, a Fresnel lens 535, and a cut rod lens 536 are used as optical components. The polarizer 533 allows input light to be output as linearly polarized light. The laser line generator lens 534 can reduce intensity differences between the center and periphery of the beam and generate uniform energy. The Fresnel lens 535 enables parallel light rays to be output, and the cut rod lens 536 expands the angular width of light input to the light-guide plate 510.

In addition, a diffuser sheet 537 is disposed on the light-extraction surface of the light-guide plate 510. Unevenness of light intensity can be reduced to improve the light intensity distribution by the diffuser sheet 537. Also the back surface of the light-guide plate 510 on the reverse side from the light-extraction surface can be provided with a prism structure that has a saw-tooth cross-section. This configuration enables green light emitted into the light-guide plate from an edge to be effectively redirected or turned to the light-extraction surface.

A diffuser sheet 537B can also be disposed between the green LD unit 30 and the light-guide plate 510. This makes it possible for green light emitted into the light-guide plate to diffuse inside the light-guide plate. In particular, it is preferable to dispose the diffuser sheet 537B in contact with an edge of the light-guide plate 510. Specifically, the diffuser sheet 537B can be attached to the edge of the light-guide plate where green light is introduced. The diffuser sheet 537B can be disposed over an entire edge of the light-guide plate, but it is preferable to dispose the diffuser sheet only in the regions of incident green light and not dispose diffuser sheet in non-illuminated regions in between adjacent green LD devices. An example of this type of diffuser sheet 537B arrangement is shown in FIG. 3. While the either diffuser sheet 537 disposed on the light-extraction surface of the light-guide plate 510 shown in FIG. 8 or the diffuser sheet 537B disposed on the edge of the light-guide plate 510 can be used independently, green light diffusion can be further enhanced by using both diffuser sheets in combination.

Preferably, green LD devices and a light-guide plate configure polarized laser type backlighting. Using green LD devices as the light source for this type of backlighting and utilizing polarization makes it possible to attain high light transmission efficiency through the LCD panel. This design will be described based on FIGS. 9A and 9B. Here, FIG. 9A corresponds to unpolarized backlighting using a CCFL or LED light source 631', while FIG. 9B illustrates polarized laser type backlighting. In the case of prior-art unpolarized backlighting shown in FIG. 9A, light utilization efficiency may be low due to absorption of more than half the light emitted from the light source 631' by the polarizer 676' behind the LCD panel 670'. In contrast, polarized laser type backlighting shown in FIG. 9B retains the polarization of light from green LD devices 631, which used as the light source for backlighting, and converts green light reflected through the light-guide plate 610 to a planar source of linearly polarized light. Consequently, light absorption by the polarizer 676 can be restrained and light utilization efficiency of the LCD panel 670 can be improved.

Figure 10:
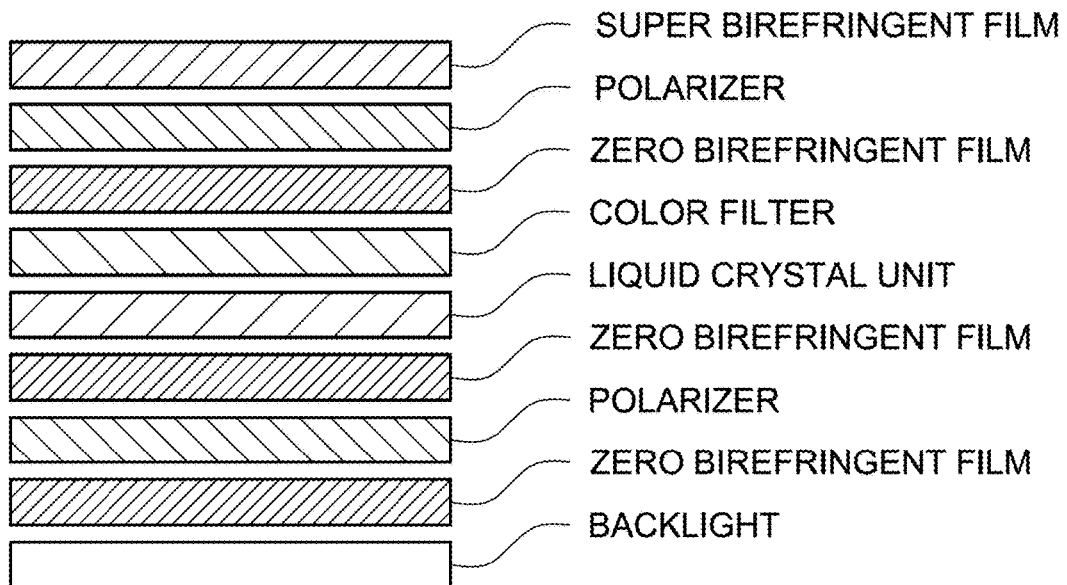
FIG. 10 is a schematic cross-sectional view showing an example of a structure incorporating zero-birefringent optical polymer.

Zero-zero-birefringent optical polymers can also be used advantageously to implement polarized laser backlighting. Polymers exhibit orientation birefringence due to polymer chain orientation, and photo-elastic birefringence due to elastic deformation. Birefringence (double-refraction due to refractive index anisotropy) is a factor causing disruption of polarization. By appropriate use of zero-zero-birefringent optical polymers, the laser light polarization state can be maintained and polarized light can be used in the liquid crystal display after conversion to a planar light source by the light-guide plate. In that case, the light-guide plate 10 is preferably constructed with light diffuser/light-guide polymer. Zero-birefringent film can be made of zero-birefringent optical polymer and stacked with a polarizing film. For example, as shown in the schematic cross-section of FIG. 10, zero-birefringent film is preferably disposed after the light-guide plate.

(Green Laser Diode Device 31)

A green LD device 31 can be formed, for example, with gallium nitride based compound semiconductors. An example of a structure employing nitride semiconductor layers and sapphire substrate as a growth substrate includes (stacked from the substrate up) the sapphire substrate, a buffer layer to relieve lattice mismatch between the sapphire substrate and nitride semiconductor, an n-type contact layer to be formed the negative contact thereon, a second n-side cladding layer, a first n-side cladding layer, a nitride semiconductor active layer that includes indium and gallium, a p-side cladding layer, p-type nitride semiconductor layers, and a p-side contact layer stacked in order. Further, it includes a positive contact stripe formed on top of the p-type nitride semiconductor layers, and optical resonance surfaces substantially orthogonal to the positive contact stripe. The p-side cladding layer is made up of a first p-side cladding layer and a second p-side cladding layer. A multi-layer film, which is a laminate of nitride semiconductors having two different compositions, is disposed between the second p-side cladding layer and the p-side contact layer. At least one of the nitride semiconductor layers in the multi-layer film includes indium or gallium, or is GaN.

The active layer (e.g. $In_xGa_{1-x}N$ [$0<x<1$]) can be n-type, p-type or intrinsic (un-doped), using intrinsic material results in stronger band-to-band light emission, so that FWHM of an emission wavelength can be narrower. This is particularly preferable for laser device implementation. In particular, extremely high output power light emitting devices can be obtained in the case where the active layer has a single or multiple-quantum-well structure. Single-quantum-wells (SQWs) and multiple-quantum-wells (MQWs) are active layer configurations that can produce light emission due to transitions between (quantum) energy levels in intrinsic InGaN. For example, in an SQW structure, the active layer has a single-composition layer made of $In_xGa_{1-x}N$ ($0 \leq x<1$). By making the $In_xGa_{1-x}N$ film thickness 100 Å or less, and more preferably 70 Å or less, energy level transition can produce strong light emission. An MQW employs a multi-layer film structure that is a laminate of a plurality of $In_xGa_{1-x}N$ (in this case, including x=0 an x=1) thin films having different composition ratios. With SQW and MQW intrinsic layers, energy level transitions produce light emission with wavelengths from approximately 365 nm to 660 nm. Film thickness for quantum-well structures is, as mentioned above, preferably 70 Å or less. In MQW structures, it is preferable to form quantum-well layers from $In_xGa_{1-x}N$ and barrier layers from similar $In_yGa_{1-y}N$ ($y<x$ and in this case, including y=0). In particular, when quantum-well layers and barrier layers are both formed with InGaN, films can be grown at substantially the same temperature resulting in an active layer with good crystalline properties. Devices with high light emission output can be produced by making barrier layer thickness 150 Å or less, and more preferably 120 Å or less. Note that the active layer can also be doped with n-type or p-type dopant.

Figure 11:
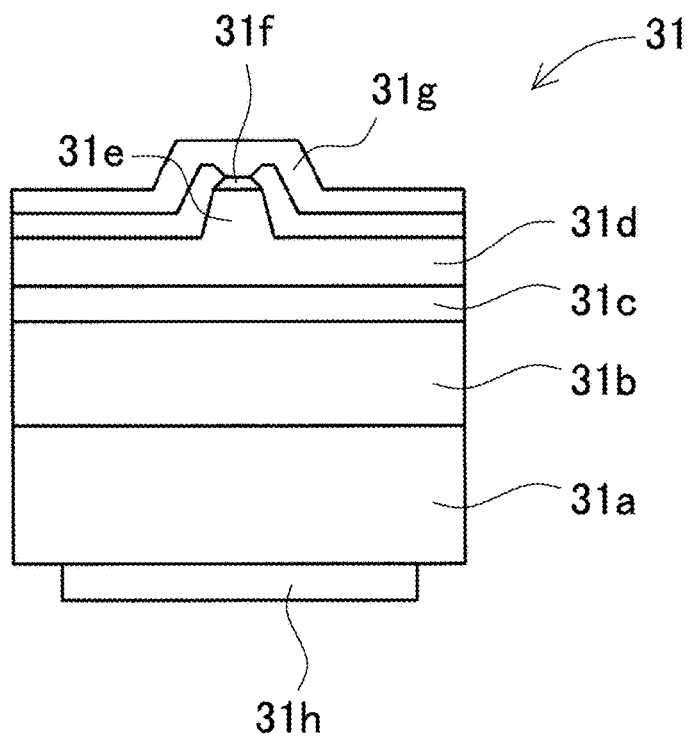
FIG. 11 is a schematic cross-sectional view showing an example of a structure of a green laser diode.

A green LD device can also have a conducting substrate such as a GaN substrate. One example of this type of green LD device 31 structure is described based on the schematic cross-section of FIG. 11. The green LD device 31 emits green laser light at an oscillating wavelength of 532 nm, is fabricated with gallium nitride based compound semiconductors, is provided with an n-type semiconductor layer 31b, an active layer 31c, and a p-type semiconductor layer 31d on a GaN substrate 31a. The n-type semiconductor layer 31b has an n-side light-guide layer. The active layer 31c has an MQW structure with two or more quantum-well layers and at least one barrier layer between the quantum-well layers. The quantum-well layer closest to the n-type semiconductor layer 31b is the first quantum-well layer, and the quantum-well layer closest to the p-type semiconductor layer 31d is the last quantum-well layer. The barrier layers have bandgap energy that is greater than the bandgap energy of the n-side light-guide layer, and the last barrier layer is on the p-type semiconductor layer side of the last quantum-well layer. The p-type semiconductor layer 31d has an electron barrier layer with a higher bandgap energy than any of the barrier layers included in the active layer 31c. Further, the p-type semiconductor layer 31d has a p-side light-guide layer between the last barrier layer and the electron barrier layer. The p-side light-guide layer has a region (on the side of the last quantum-well layer) with lower bandgap energy than the n-side light-guide layer, and has a region (on the side of the electron barrier layer) with greater bandgap energy than the n-side light-guide layer. Namely, the p-side light-guide layer has a composition gradient in which the bandgap energy increases approximately linearly from the low bandgap energy region to the high bandgap energy region.

As mentioned, the green LD device 31 of this embodiment is provided with an n-type semiconductor layer 31b, an active layer 31c, and a p-type semiconductor layer 31d on a GaN substrate 31a. The n-type semiconductor layer 31b is provided with a under layer made of an $Al_xGa_{1-x}N$ ($0 \leq x < 1$), a first n-side semiconductor layer made of Si-doped $In_yGa_{1-y}N$ ($0 \leq y < 1$), a second n-side semiconductor layer made of Si-doped $Al_xGa_{1-x}N$ ($0 \leq x < 1$) and Si-doped GaN, and a n-side light-guide layer made of un-doped $In_yGa_{1-y}N$ ($0 \leq y < 1$). The active layer 31c is provided with an first quantum-well layer made of un-doped $In_yGa_{1-y}N$ ($0 \leq y < 1$) on a first barrier layer made of Si-doped GaN, a mid-level barrier layer made of un-doped GaN, a second quantum-well layer made of un-doped $In_yGa_{1-y}N$ ($0 \leq y < 1$), and a last barrier layer made of GaN layer grown. These layers configure an MQW structure. The p-type semiconductor layer 31d is provided with a p-side light-guide layer grown with an approximately linear composition gradient of indium as $In_yGa_{1-y}N$ ($0 \leq y < 1$) side is on the quantum-well side and GaN side is on the electron barrier layer side, an electron barrier layer made of Mg-doped $Al_xGa_{1-x}N$ ($0 \leq x < 1$), a p-side cladding layer made of un-doped $Al_xGa_{1-x}N$ ($0 \leq x < 1$) and Mg-doped $Al_xGa_{1-x}N$ ($0 \leq x < 1$), and a p-side contact layer made of Mg-doped GaN. A ridge 31e is formed on the semiconductor structure described above. A p-side electrode 31f made of indium-tin-oxide (ITO) is formed on top of the ridge 31e, and a bond-pad 31g is formed on the upper surface of the semiconductor structure and the ridge and the p-side electrode. An n-side electrode 31h is formed on the bottom surface of the GaN substrate 31a. Also, resonator end-planes and end-plane mirrors are established on this structure to make a green LD device with a wavelength of 532 nm.

As shown in FIG. 2, blue LED device 21 illumination is controlled by the LED driver circuit 22. Similarly, green LD device 31 light emission is controlled by the LD driver circuit 32. The light-guide plate 10 guides and diffuses blue light emitted from each blue LED device 21 in the blue LED unit 20 and green light emitted from each green LD device 31 in the green LD unit 30. The backlight unit is principally made up of the light-guide plate 10, the blue LED unit 20, and the green LD unit 30.

(Light-Guide Plate 10)

The light-guide plate 10 of the present embodiment is formed in a flat-plate shape having a thickness that is thin compared to the width dimension. The light-guide plate is quadrangular (specifically, rectangular) in a plan view. The light-guide plate 10 includes the first principal plane, the second principal plane, and four edges. The first principal plane of the light-guide plate 10 is served as the light-extraction surface, which is where light emits out of the light-guide plate. The surface on the opposite side, which is the second principal plane, is served as a reflecting surface. A light reflecting component can be established on the reflecting surface side to reflect light to light-extraction surface on the opposite-side. As shown in FIG. 2, the light reflecting light component can be a reflector sheet 16 separate from the light-guide plate 10, or an integral structure can be adopted where direct processing (e.g. light diffusion-dot patterning) is implemented on the surface light-guide plate 10. Or, diffusing material can be initially impregnated in the resin of the light-guide plate to implement a structure that emits light from the light-extraction surface due to reflection and scattering effects.

Resins such as acrylic resin, polycarbonate resin, amorphous polyolefin resin, polystyrene resin, norbornene based resins, and cyclo-olefin polymer (COP) can be used as a material of the light-guide plate 10. These types of materials may be injection molded to form the light-guide plate 10.

To implement edge-lighting type unit, that is a blue LED unit 20 and green LD unit 30 are disposed at edges of the light-guide plate 10, it is preferable for edges of the light-guide plate that optically couple with the point-source LEDs and LDs to incorporate a plurality of cut-out sections or notches. This allows efficiently light input from the light sources into the light-guide plate 10 and allows dark areas to be reduced by expands the regions inside the light-guide plate 10 that are illuminated by the input light.

Further, in edge-lighting type unit having blue LED and green LD units 20, 30 disposed at edges of the light-guide plate 10, it preferable to dispose optical sheet that reflects light inside the light-guide plate 10 at the edges that have no blue LED unit 20 or green LD unit 30. This allows light that has passed through the inside of the light-guide plate 10 to be reflected at edges provided with optical sheet and can efficiently return that light to the inside of the light-guide plate 10.

Figure 12:
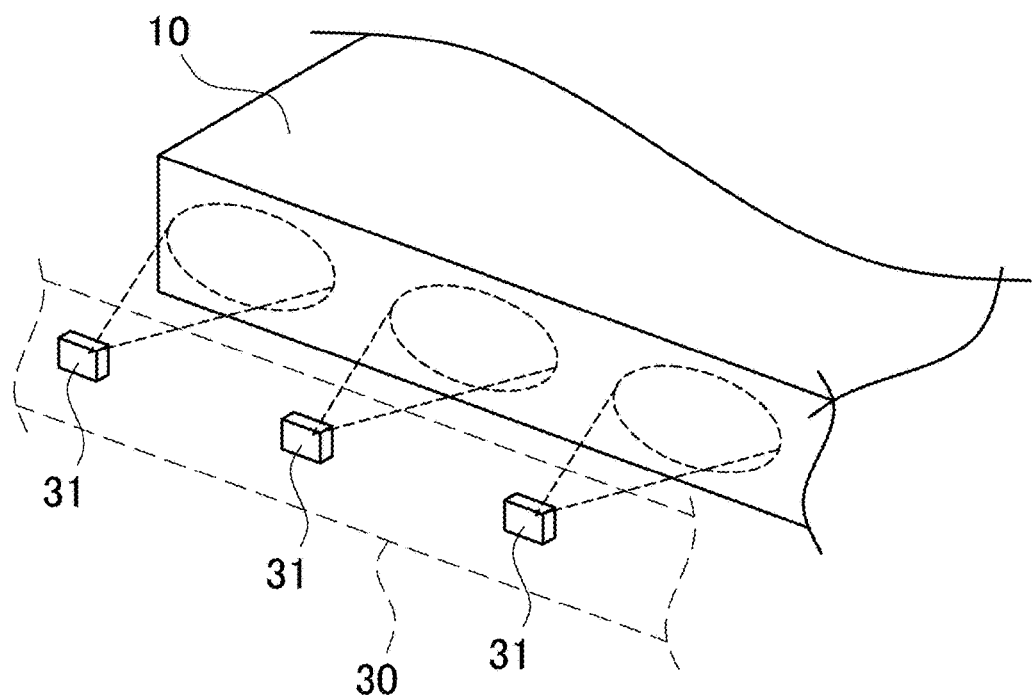
FIG. 12 is a schematic enlarged partial perspective view showing an example of arrangement of the green laser diodes which optically coupled with the light-guide plate.

Also in edge-lighting type unit having a green LD unit 30 optically coupled to an edge of the light-guide plate 10, it is preferable to dispose the green LD devices 31 with an orientation that aligns its laser far-field intensity pattern with the lengthwise direction of the light-guide plate 10 edge. In detail, as shown in FIG. 12, in the case where the far-field pattern of the green LD devices 31 shows an elliptical rather than circular pattern, the rotation angle about the beam-axis of each green LD device 31 is adjusted to align the major axis of the elliptical far-field pattern with the lengthwise direction of the light-guide plate 10 edge. This adjustment enables light output from the green LD devices 31 to be efficiently introduced inside the light-guide plate 10.

Further, in the case where green LD devices 31 are used in combination with the light-guide plate 10, use of a light-scattering type light-guide plate 10 is preferable over a total-reflection type light-guide plate 10. This is because laser light has strong directivity with a limited beam divergence angle compared to Lambertian-distributed LED light.

(Color Filters)

Figure 13:
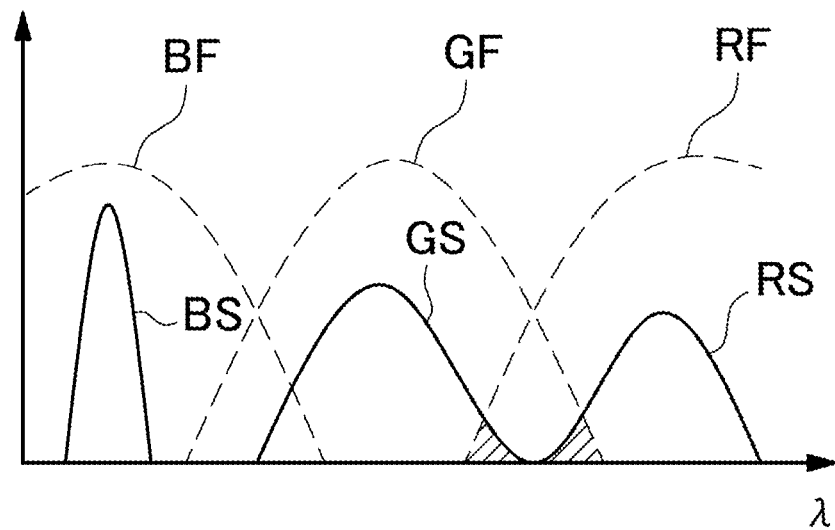
FIG. 13 is a schematic spectrum showing color filtering applied to a conventional backlight source that combines gallium-nitride based blue LEDs, β-SiAlON green phosphor, and $CaAlSiN_3$ (CASN) red phosphor.

A liquid crystal display device may be provided with color filters to separate white-light, which is obtained by mixing blue light from blue LED devices 21, red light from red phosphor material, and green light from green LD devices 31, into its individual RGB components (i.e. a red color filter, a green color filter, and a blue color filter are provided). A color filter passes light in a given range of wavelengths to display the predetermined color. Ideally, the transmissivity peak of the color filter and the intensity peak of the light emission spectrum coincide, and the light transmission characteristics of different colors do not overlap. For example, in the case of a backlight source that combines blue LED devices 21, β-SiAlON as green phosphor material, and CASN ($CaAlSiN_3$) as red phosphor material, the RGB component spectra RS, GS, and BS are as shown in FIG. 13, some bands of wavelengths of the light are blocked when the light is passed through a blue color filter BF, green color filter GF, and red color filter RF, since the green spectrum GS and the red spectrum RS have overlapping tail regions (shown as hatched portion in FIG. 13) that overlap with the wavelength which cut by the red color filter RF and the green color filter GF respectively. To avoid this situation, passage of undesired wavelengths can be blocked by increasing pigment concentration in the color filter. However, this reduces color filter transmissivity and brightness.

Figure 14:
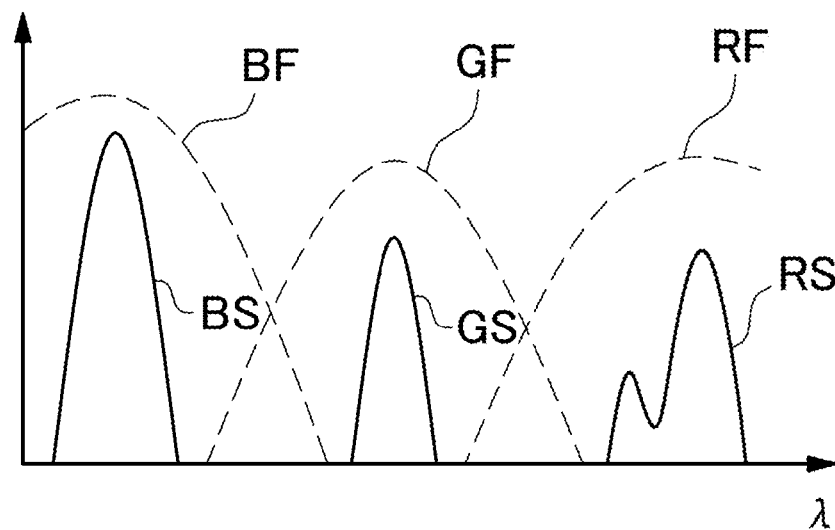
FIG. 14 is a schematic spectrum showing color filtering applied to a backlight source according to the present discloser that combines gallium-nitride based blue LEDs, gallium-nitride based green laser diodes, and $K_2SiF_6$ (KSF) red phosphor.

In contrast, the backlight source for the present embodiment not only uses blue LED devices with a sharp intensity peak, but also employs KSF red phosphor material and green LD devices instead of green phosphor. As shown in FIG. 14, the FWHM of the spectral peaks for red and green light are narrower (compared to FIG. 13), so that width of blocked wavelengths in the tail regions of the green spectrum GS and the red spectrum RS by the red color filter RF and the green color filter GF are drastically reduced. This makes it possible to produce higher intensity white-light and increases quantity of light. Specifically, since the tail of the spectrum of one color does not extend into spectral region of another color such as for the broad spectra of green and red phosphors included conventional structure, there may not be necessity to adjust properties of red and green color filter to block those tail region wavelengths. That is, the width of wavelength that need to be blocked by the red and green color filters are reduced, and filter transmissivity can be increased. As a result, red and green light transmissivity can be increased and overall light extraction efficiency can be improved. Accordingly, blue, green, and red light can be efficiently separated, and a liquid crystal display device light source can be obtained that increases light output while maintaining good color rendering.

In this embodiment, the peak wavelength of red phosphor material is set from 625 nm to 635 nm and preferably around of 630 nm, the peak wavelength of the green LD device 31 is set from 487 nm to 537 nm and preferably around 532 nm, and the peak wavelength of the blue LED device 21 is set from 462 nm to 452 nm and preferably around 467 nm.

Further, it is preferable to dispose the green LD unit 30 along the edge of the light-guide plate 10 that becomes the bottom side edge when the light-guide plate 10 is assembled in the liquid crystal display device. The green LD unit 30 may be larger and heavier than the blue LED unit 20 due to providing with heat dissipating structure etc. By disposing the green LD unit 30 at the bottom side of the liquid crystal display device assembled with the backlight unit 100 inside, the liquid crystal display device can attain a more stable weight distribution (i.e. the center of gravity is lowered) in the upright orientation. In addition, orienting the side of the outer frame of the display that has thicker than the other sides at the bottom gives the liquid crystal display device an aesthetically pleasing external appearance and allows a clean design to be achieved.

Although the example above describes linear arrangements of LED devices and LD devices in light source units, the present invention is not limited to that configuration. Configurations where LED devices and LD devices are mounted individually on the edges and/or backside of the light-guide plate are also possible.

Second Embodiment

The green LD unit 30 may be a single unit disposed along an edge of the light-guide plate 10, may also be divided and disposed as a plurality of subunits. As shown in the alternate example backlight unit 700 in the schematic plan view of FIG. 15, a first green LD unit 730b is disposed along the second edge of the light-guide plate 710, which is a short side edge, a second green LD unit 730a is disposed along a fourth edge, which is opposite the second edge, and a blue LED unit 720 and red phosphor material (e.g. red phosphor sheet 740) are disposed along a first edge, which is a lengthwise side edge. Beam-axes of the green LD devices 731 disposed at opposite edges of the light-guide plate 710 (i.e. at the second edge and fourth edge) are substantially parallel and each device is disposed in a manner that avoids the beam-axis of the each device overlap. Specifically, the same total number of green LD devices can be used as in the embodiment of FIG. 3 are mounted as every other green LD device 31 of the green LD unit 30 in FIG. 3 is disposed at one edge (the second edge) and the remainder of devices disposed at the other edge (in the second green LD unit 730b along the fourth edge). The arrangement shown in FIG. 15 allows greater distance between adjacent green LD devices 731 than when those devices are disposed along a single edge, it is advantageous from a heat dissipation viewpoint. Further, by disposing green LD devices 731 alternately at opposite edges (edges at the left and right ends of FIG. 15) of the light-guide plate 710, laser light introduced from opposite directions can be uniformly dispersed when that light is redirected to the first principal plane of the light-guide plate 710.

Third Embodiment

Figure 16:
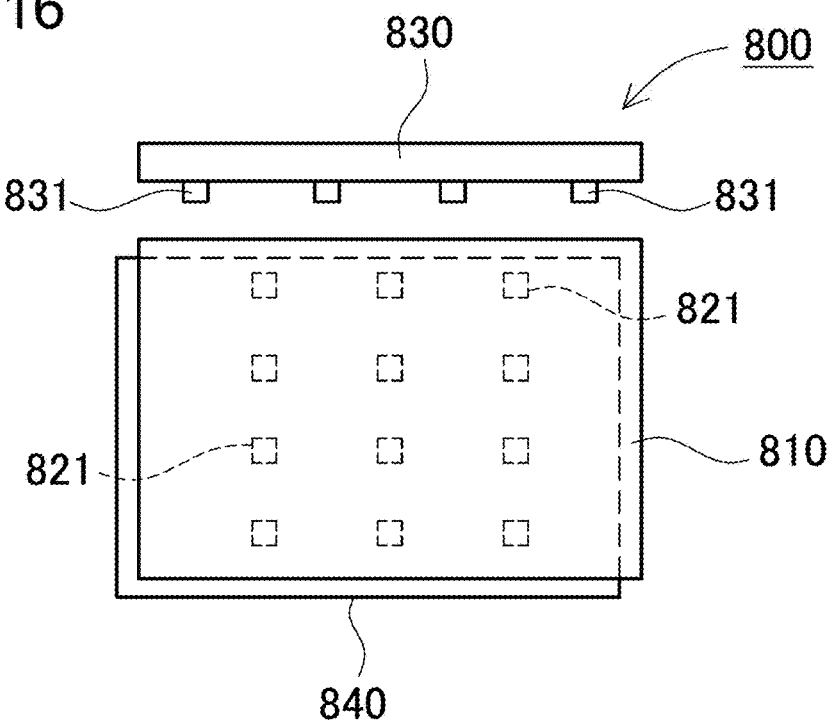
FIG. 16 is a schematic plan view showing a direct LED backlighting type unit according to the third embodiment.

In addition to edge-lighting type unit where blue LED devices are disposed at an edge of the light-guide plate, direct backlighting type unit that disposes the blue LED devices at the backside of the light-guide plate is also possible. A schematic plan view of the backlight unit 800 for the third embodiment of a liquid crystal display device with a light-guide plate 810 is shown in FIG. 16. Blue LED devices 82 are configured for direct backlighting type. As shown in this figure, a green LD unit 830 is disposed at a second edge of the light-guide plate 810, and the blue LED devices 821 and red phosphor material (e.g. a phosphor sheet 840) are disposed on the backside (the second principal plane side which is opposite the first principal plane) of the light-guide plate 810. The blue LED devices 821 are preferably disposed with approximately equal intervals to obtain light at the first principal plane that is as uniform as possible. Further, optical elements such as a light scattering plate can be used to minimize unevenness of brightness and make the distribution of light more homogeneous. In addition, the blue LED devices 821 may be added a distribution expanding member such as a secondary lens to each LED for widening light dispersion from blue LED devices.

With this configuration, that is, disposing blue LED devices 821 and red phosphor material on the backside of the light-guide plate 810 while disposing green LD devices 831 at an edge of the light-guide plate 810, the red phosphor material and blue LED devices 821 are separated from the green LD devices 831, and this can suppress thermal degradation of the red phosphor material and blue LED devices 821 due to heat generated by the green LD devices 831.

This embodiment describes direct backlighting type unit by disposing blue LED devices on the backside of the light-guide plate combined with edge-lighting by green LD devices disposed along an edge of the light-guide plate. However, the present invention is not limited to this arrangement. For example, green LD devices can be disposed in a direct backlighting type configuration on the backside of the light-guide plate and blue LED devices can be disposed along an edge of the light-guide plate in an edge-lighting type configuration as well.

Fourth Embodiment

Figure 15:
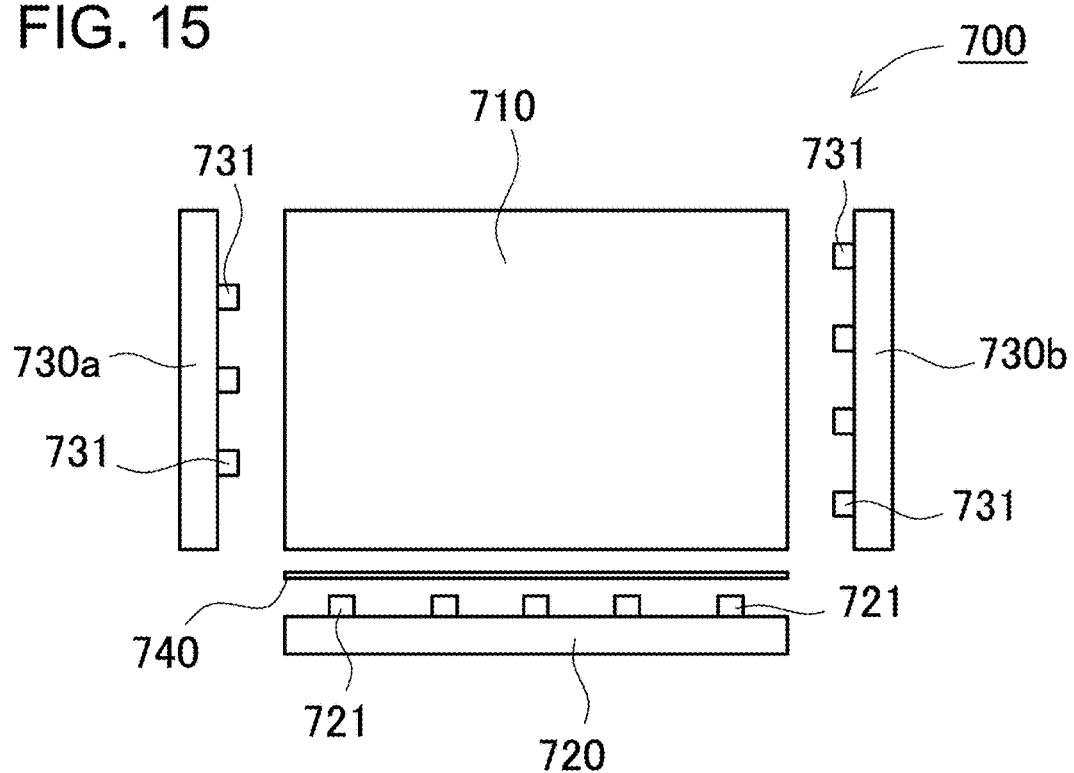
FIG. 15 is a schematic plan view showing an embodiment of green laser diodes disposed at opposing edges extending a lengthwise direction of the light-guide plate according to the second embodiment.
Figure 17:
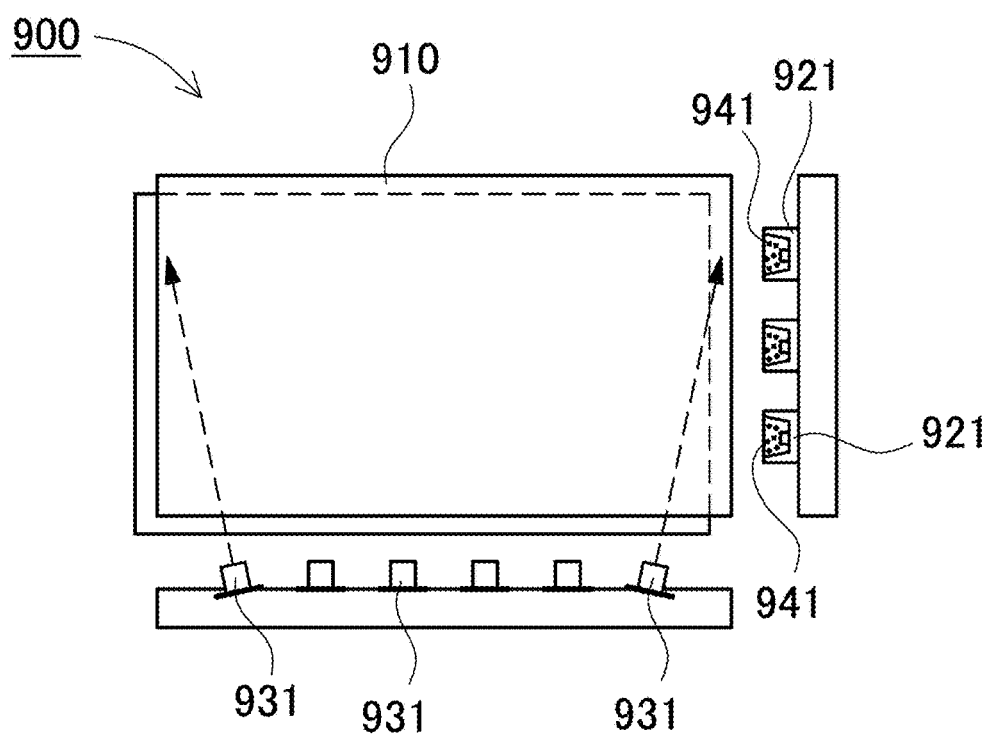
FIG. 17 is a schematic plan view showing a backlight unit according to the fourth embodiment.

The embodiments above describe configurations where light emitted from all the green LD devices emits in parallel beams and light emitted from all the blue LED devices also emits in parallel beams. However, the present invention is not limited to this configuration, and some of the devices can be mounted to incline their light beams off the parallel direction as well. An example of this type is shown in the schematic plan view of FIG. 17 as the fourth embodiment. In the backlight unit 900 shown in this figure, the green LD devices 931 at the ends of the row of green LD devices 931 are disposed at oblique angle to change the direction of green light beam and spread light from the inside towards the outside of the light-guide plate 910. In this manner, by angling outward green LD devices 931 at both ends of the row of multiple of green LD devices 931, green LD devices disposed on the corner region (the ends of the row) shown in FIG. 3 may be omitted. Thus, greater distance can be established between the blue LED devices 921 and the red phosphor material 941 disposed on an adjacent edge and the green LD devices 931, the effects of heat from the green LD devices 931 on the blue LED devices 921 and the red phosphor material 941 can be reduced. As shown in FIG. 15 no phosphor sheet intervenes between the green LD devices and the light-guide plate in this embodiment as well as the embodiment in FIG. 3.

By biasing the arrangement of green LD devices 931 rather than disposing them equally on the perimeter of the light-guide plate 910, dark area which has weak light emission may develop at the first principal plane (light-extraction surface) of the light-guide plate 910 partially. Such dark area can be reduced by providing optical component within the light-guide plate 910 such as reflecting or scattering part of the green light to opposing directions.

As described above, the red phosphor material can be protected from thermal effects by establishing distance between the phosphor and the green LD devices, which generate large amount of heat. It is preferable not to dispose the green LD devices in a dense arrangement, but rather to establish distance between individual devices. In particular, in the case where light sources are disposed immediately next to each other, that is, heat sources are disposed closely, heat dissipation properties are degraded. For this reason, it is preferable from a heat dissipation and lifetime extension perspective to dispose the blue LED devices and the green LD devices in different locations.

Arrangements of the blue LED devices and green LD devices around the light-guide plate can be appropriately selected according to requirements and specifications for the light-guide plate such as light intensity, illumination area, and thickness. In particular, design considerations such as layout and number of LED and LD devices may be constrained depending on the size of the liquid crystal display device.

The embodiments above described include a common light-guide plate which guides light from both the blue LED devices and the green LD devices for making the backlighting compact. In contrast, it is possible to use a plurality of the light-guide plates, such as a light-guide plate for blue LED device and a light-guide plate for green LD device. For example, the light-guide plate for blue LED device and the light-guide for green LD device plate can be stacked in a double layer to obtain white-light which is mixed blue light and green light. In the case that a phosphor sheet that includes red phosphor material is added to that stacked light-guide plate, preferably more distance is established from the green LD devices than from the blue LED devices. However, using a plurality of light-guide plates may make the backlighting bulky and reduce light intensity, so that it is preferable to use a common light-guide plate for both the blue LED devices and green LD devices.

Fifth Embodiment

It is also possible to adopt a structure where light introduced to the light-guide plate is reflected at an edge of the light-guide plate which is opposite to the edge in which the light introduced and returned to the side of the light source. As shown in FIGS. 18A-18D, the light-guide plate 1010 can have the edge served as a reflecting surface. The reflecting surface edge is opposite to an incident edge, which is where light from green LD devices 1031 is introduced, and the light introduced from the incident edge reflects at the reflecting surface edge for returning the light inside the light-guide plate 1010. This structure allows for obtaining output light that is substantially uniform over the entire first principal plane and reducing the number of the green LD devices 1031 which generate heat to limit heat generation by scattering the highly directional green laser light inside the light-guide plate 1010. In particular, since light from the green LD devices are highly directional, scattering the light is essential, and from thermal considerations, limiting the number of LD devices is preferable. Accordingly, the structure that reflects light introduced from one edge of the light-guide plate 1010 off the opposing edge (reflecting surface) can obtain uniform light emission from the entire first principal plane of the light-guide plate 1010 even with a limited number of green LD devices.

Figure 18A:
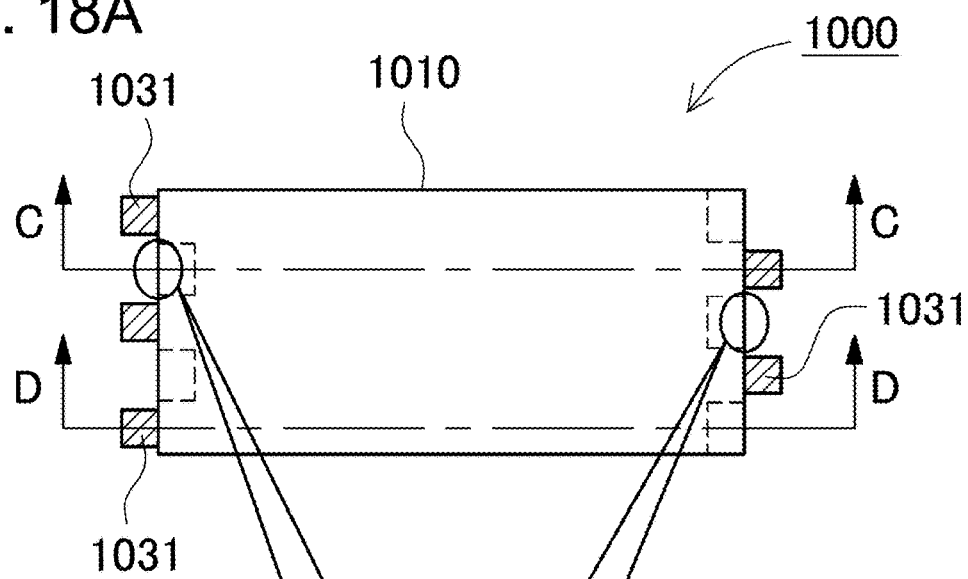
FIG. 18A is a schematic plan view showing a backlight unit according to the fifth embodiment, FIG. 18B are schematic enlarged partial horizontal cross-section insets showing light-reflecting edges of the backlight in FIG. 18A.
Figure 18B:
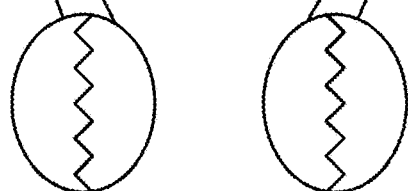
FIG. 18C is a schematic vertical cross-section through the line C-C in FIG. 18A.
FIG. 18D is a schematic vertical cross-section through the line D-D in FIG. 18A.
Figure 18C:
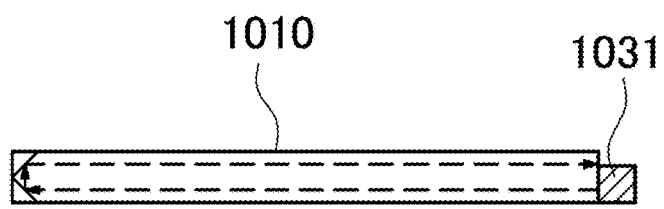
Figure 18D:
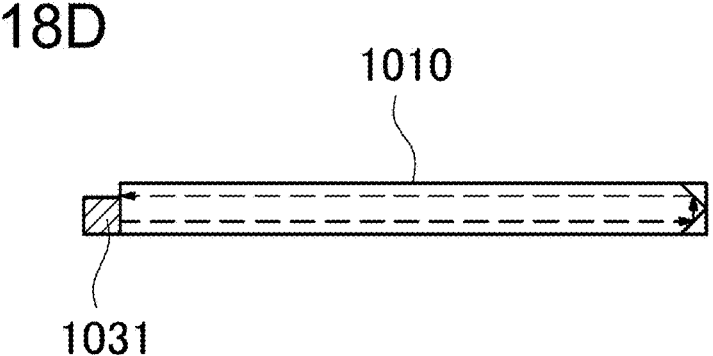

As shown in FIGS. 18C and 18D, in a backlight units 1000 of an alternate embodiment, edges, which are opposite the edges where green LD device 1031 are installed, are formed with angled segments having an L-like shape in cross-sectional view, and by establishing a total reflection angle such as 90°, laser light can be returned to the edge where LD device are installed.

Alternatively, as shown in the enlarged horizontal cross-section insets of FIG. 18B, edges of the light-guide plate 1010 opposite the green LD devices 1031 can also be formed with a saw-tooth pattern to scatter the laser light.

The backlight unit shown in FIGS. 18A and 18B has similar structure to that previously described for FIG. 15 in that green LD devices 1031 are disposed in an alternating manner at opposite edges of the light-guide plate 1010 and are offset to avoid light beam overlap. By reflecting laser light off opposing edges, a sufficient amount of light can be secured to achieve uniform backlighting while reducing the number of green LD devices 1031 employed.

Sixth Embodiment

Green LD devices having a plurality of different peak wavelengths can also be used instead of devices that all have substantially the same peak wavelength characteristics. With this configuration, it is possible to avoid speckle noise that occurs in single-beam laser light. When laser light is emitted to an object, a speckle noise like granular pattern may appear. Speckle noise results from interference patterns produced by scattered light when light from a coherent light source (e.g. laser light) is incident on a surface with random topology (i.e. a diffusing object). Using multi-mode laser obtained by laser light having different wavelengths rather than laser light that has a single-mode spectrum can be suppress speckle noise generation. In particular, sufficient reduction in coherence of light can be achieved by spreading the width of the emission spectrum of the multi-mode laser.

Preferably, spacing between emission spectrum peaks of green LD devices is within a range from 1 meV to 100 meV. However, spacing between all adjacent emission peaks does not necessarily have to be within this range.

Figure 19:
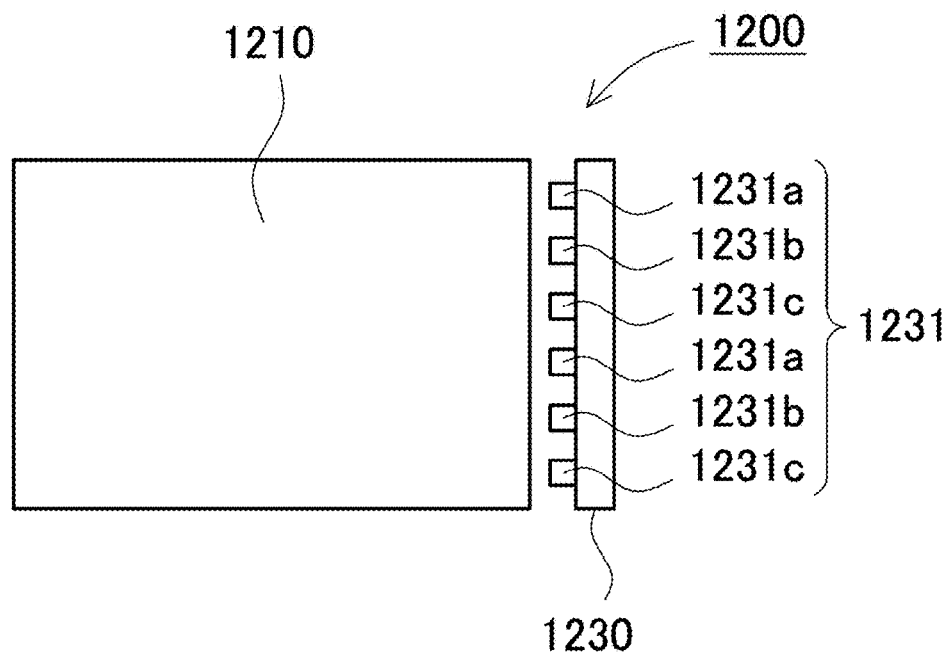
FIG. 19 is a schematic plan view showing backlight unit according to the sixth embodiment.

As one embodiment of this structure, FIG. 19 shows a plan view of a light-guide plate 1210 in backlight unit 1200 as an alternate embodiment. In FIG. 19, first green LD devices 1231a having an emission peak wavelength of 520 nm, second green LD devices 1231b having an emission peak wavelength of 525 nm, and third green LD devices 1231c having an emission peak wavelength of 530 nm are mounted in the green LD unit 1230. The emission peak wavelengths of the semiconductor laser diodes can be made different, for example, by varying mixed crystal ratio of the indium in the active layer (e.g. $In_xGa_{1-x}N$ [0<x<1]). This can reduce speckle noise generated by single-mode green LD devices. As shown in FIG. 19, the green LD devices 1231 having different wavelength can be arranged in a given repeating pattern, or they can be disposed in a completely random fashion. Further, instead of providing three types of green LD devices with different peak wavelengths each other, two different types of devices or four or more different types of devices can be provided. Still further, instead of providing plurality of individual green LD devices having different peak wavelengths each other, a single integrated green LD device can be provided that has a plurality of semiconductor structures having different peak wavelengths each fabricated on a common substrate.

Figure 20:
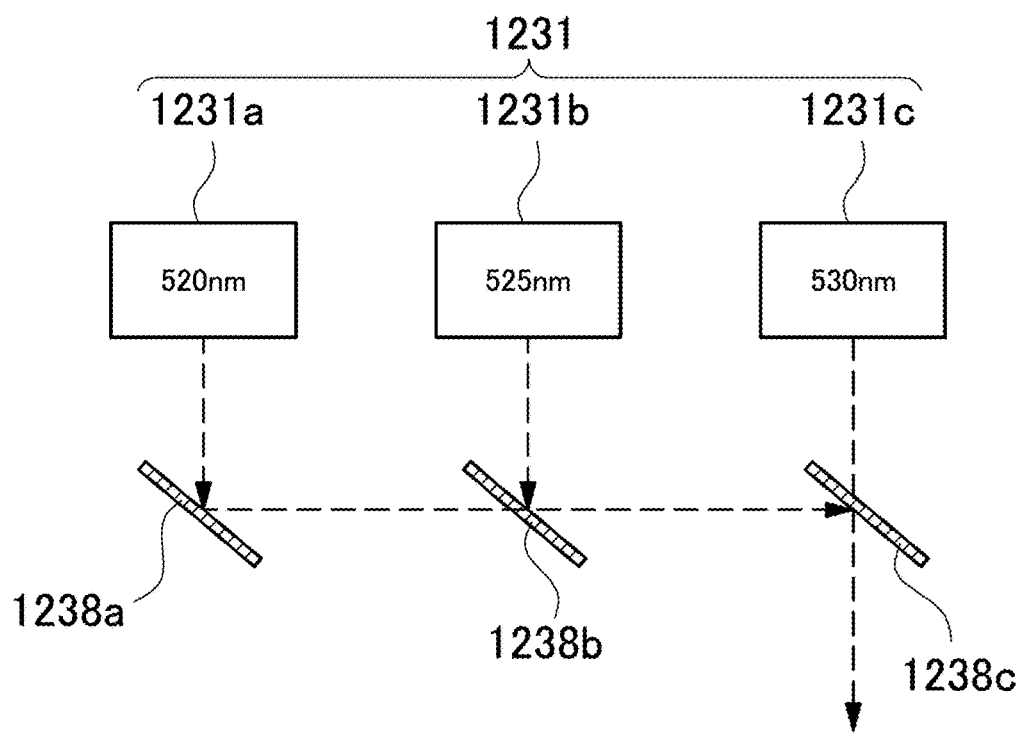
FIG. 20 is a schematic diagram showing a structure to align green light beams from first, second, and third green laser diodes.

A structure for aligning the beam-axes of the plurality of green LDs having different peak wavelengths each other. For example, the plurality of green LD beams can be merged together by a combination of reflecting plates and optical filters. Specifically, as shown in FIG. 20, use of dichroic-mirrors that pass specific wavelengths can be considered. Here, a first dichroic-mirror 1238a, a second dichroic-mirror 1238b, and a third dichroic-mirror 1238c are each disposed at an inclined angle with respect to incident light from the first green LD device 1231a, the second green LD device 1231b, and the third green LD device 1231c respectively. These mirrors are disposed so that the optical axes of reflected light beams are coincident. The first dichroic-mirror 1238a is disposed at an incline with respect to the beam-axis of the first green LD device 1231a, which emits 520 nm green light, and reflects that 520 nm green light in a horizontal direction. Similarly, the second dichroic-mirror 1238b is disposed at an incline with respect to the beam-axis of the second green LD device 1231b, which emits 525 nm green light, and reflects that 525 nm green light in a horizontal direction to align it with the beam-axis of the horizontally reflected 520 nm light. Further, the third dichroic-mirror 1238c is disposed at an incline with respect to the beam-axis of the third green LD device 1231c, and reflects the 520 nm and 525 nm green light, which is horizontally reflected by the first dichroic-mirror 1238a and second dichroic-mirror 1238b respectively, to the output direction. The third dichroic-mirror 1238c passes 530 nm light emitted by the third green LD device 1231c to align that beam-axis with the output direction. With this configuration, outputting 520 nm, 525 nm, and 530 nm color mixed green laser light with a common beam-axis can be obtained and speckle noise can be reduced.

Figure 21:
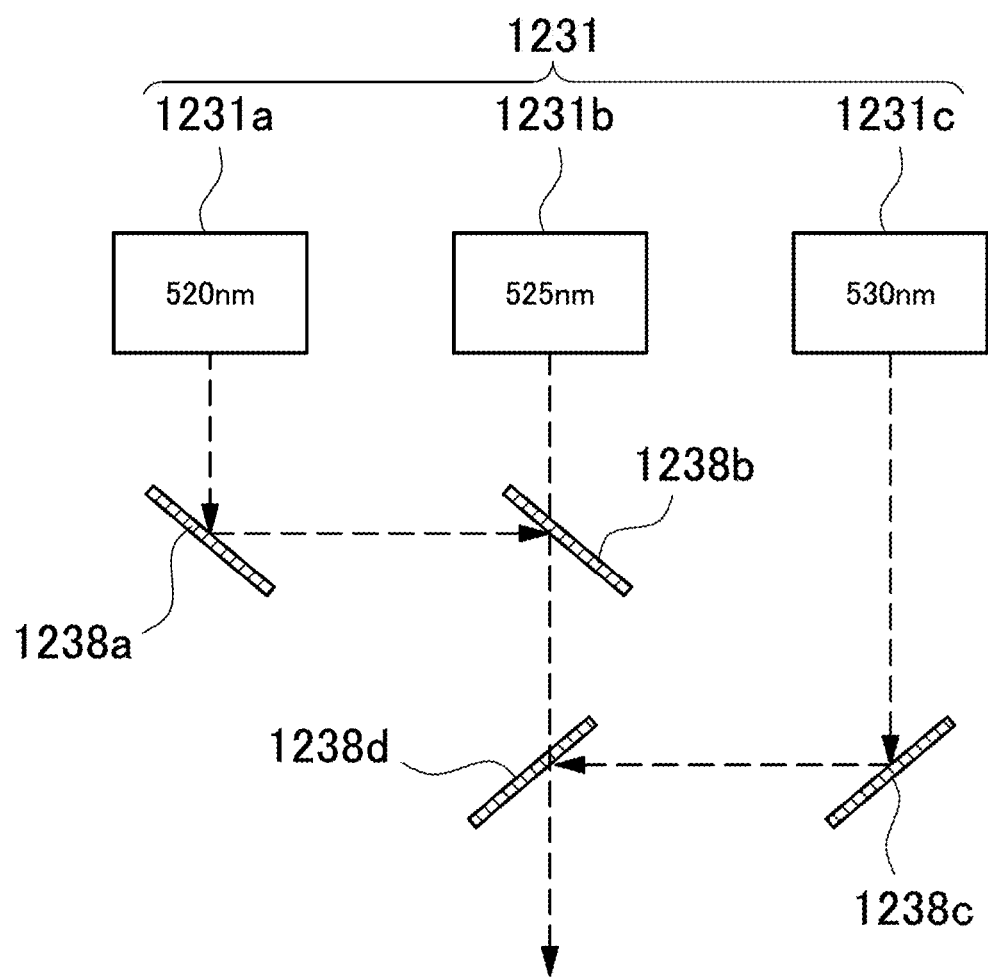
FIG. 21 is a schematic diagram showing another structure to align green light beams from first, second, and third green laser diodes.

As another embodiment, the configuration shown in FIG. 21 can also be used to align the beam-axes of green LDs having different peak wavelengths. In this configuration, a first dichroic-mirror 1238a is disposed in the optical path of light from the first green LD device 1231a, and a third dichroic-mirror 1238c is disposed in the optical path of light from the third green LD device 1231c. In addition, a second dichroic-mirror 1238b and fourth dichroic-mirror 1238d are disposed in a separated manner along the beam-axis of the second green LD device 1231b. The first dichroic-mirror 1238a is disposed at an incline with respect to the beam-axis of the first green LD device 1231a, which emits 520 nm green light, and reflects that 520 nm green light in a horizontal direction. The second dichroic-mirror 1238b is disposed at an incline with respect to the beam-axis of the second green LD device 1231b, reflects 520 nm green light horizontally reflected by the first dichroic-mirror 1238a to the output direction, and passes 525 nm green light emitted by the second green LD device 1231b to align its beam-axis with that of the reflected 520 nm green light. The third dichroic-mirror 1238c is disposed at an incline with respect to the beam-axis of the third green LD device 1231c, which emits 530 nm green light, and reflects that 530 nm green light in a horizontal direction. Further, the fourth dichroic-mirror 1238d is disposed at an incline with respect to the beam-axis of the second green LD device 1231b, reflects 530 nm green light horizontally reflected by the third dichroic-mirror 1238c to the output direction, and passes 520 nm green light horizontally reflected by the second dichroic-mirror 1238b as well as 525 nm green light passed by the second dichroic-mirror 1238b to align those beam-axes with that of the reflected 530 nm green light. In this system as well, speckle noise can be reduced by outputting 520 nm, 525 nm, and 530 nm color mixed green laser light with a common beam-axis.

The preceding describes specific examples, and system parameters such as peak wavelengths of green LD devices, number of devices, device location, dichroic-mirror reflection spectra, and mirror location can be varied appropriately. In addition, "beam-axes alignment" and "coincident" in description of FIGS. 20 and 21 may include perfect alignment and alignment with some misalignment. Such misalignment may be permitted as long as the design of the device (for example the common beam-axis design for a given lens or the like) are managed.

Figure 22A:
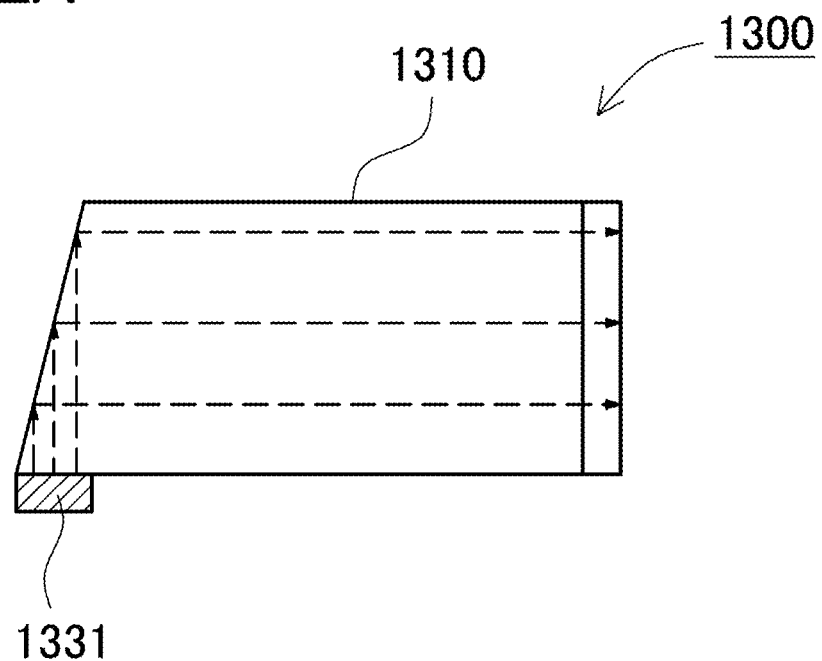
FIG. 22A is a schematic plan view showing backlight unit according to an alternate embodiment.
Figure 22B:
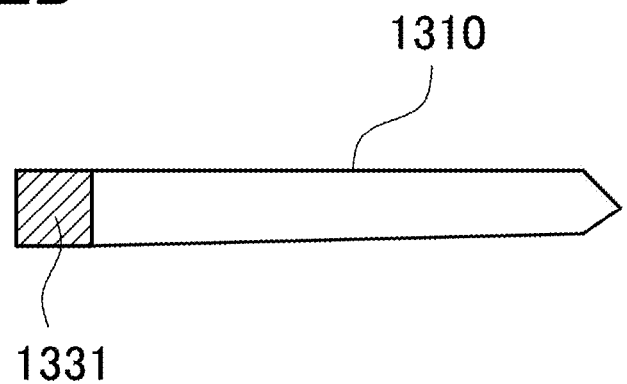
FIG. 22B is a schematic cross-sectional view of FIG. 22A.

As another alternate example, a backlight unit 1300 is shown in the plan view of FIG. 22A and the cross-sectional view of FIG. 22B. As shown in the figures, the light-guide plate 1310 (as viewed from above in FIG. 22A) can have an edge that is oblique (not orthogonal) with respect to other edge, and the green LD device(s) 1331 is disposed at the end of the edge which formed an acute angle with respect to the inclined edge. The unit can be configured to introduce laser light into the light-guide plate 1310, reflect light off the surface that is inclined with respect to the incident light, and redirect that light as parallel beams towards the edge opposite the inclined edge. This configuration makes it possible to avoid disposing green LD devices along edges of the light-guide plate 1310. For example, when the bottom edge of a display device is configured to correspond to the bottom edge in FIG. 22A, the green LD device(s) 1331 can be disposed at the bottom of the display device allowing a design that has a stable weight distribution (i.e. low center of gravity).

Figure 9A:
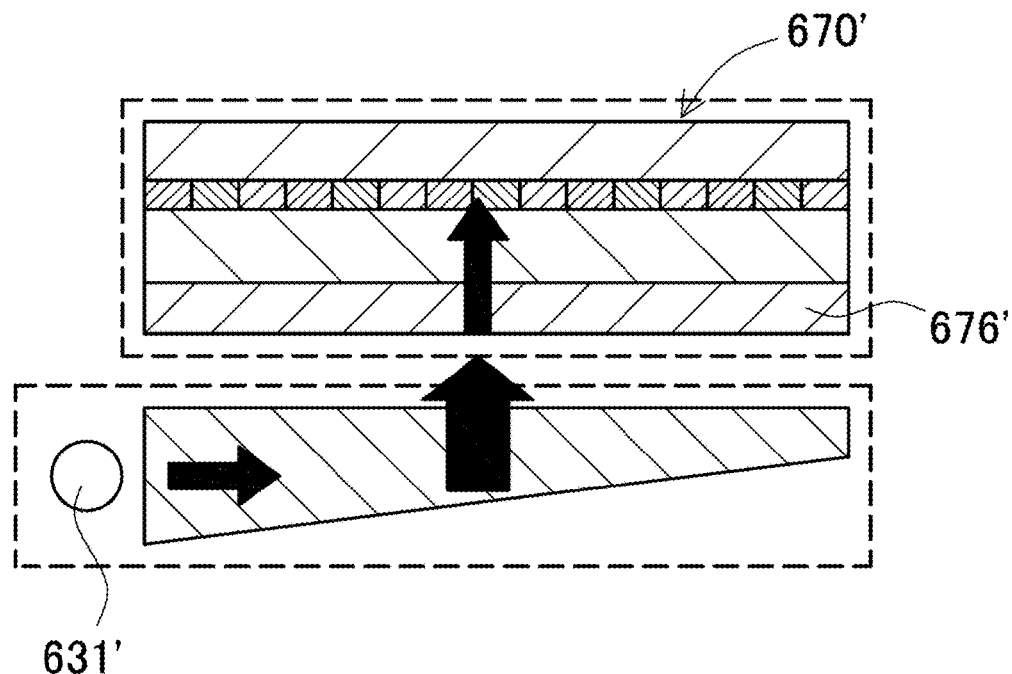
FIG. 9A is a schematic vertical cross-sectional view showing an unpolarized backlight configuration.
Figure 9B:
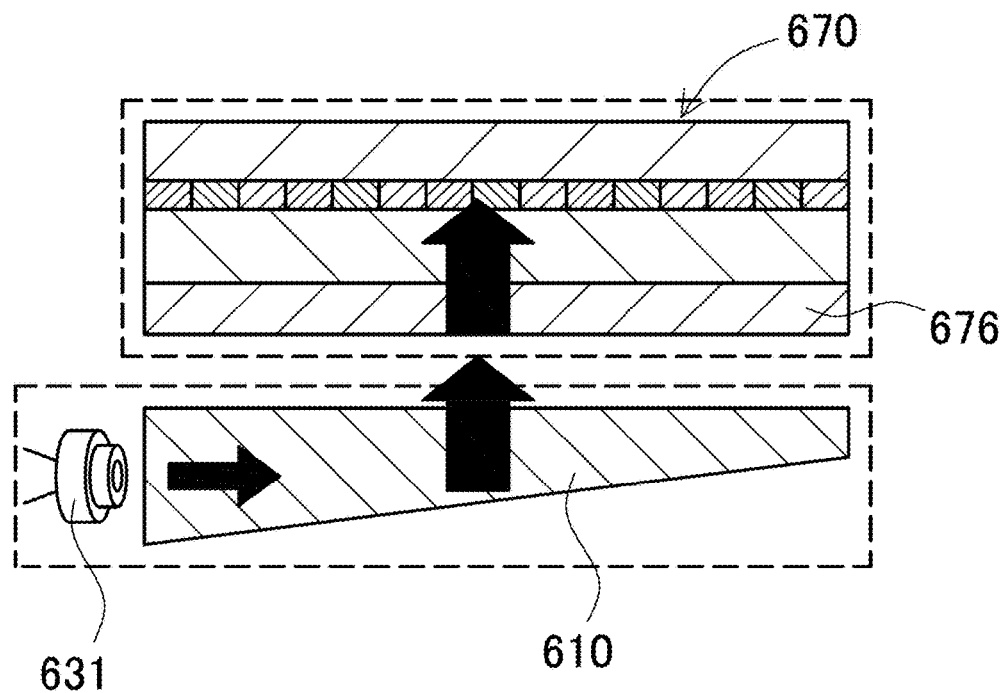
FIG. 9B is a schematic vertical cross-sectional view showing one embodiment having a polarized laser backlight configuration.
Figure 23:
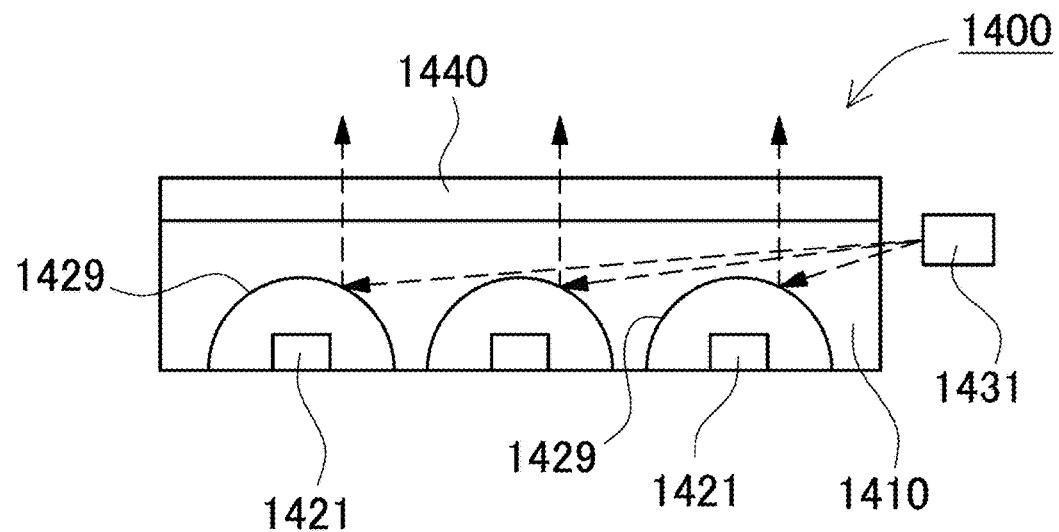
FIG. 23 is a schematic vertical cross-sectional view showing backlight unit according to another alternate embodiment.

As backlight structures that redirect incident light from an edge to the light-extraction surface (viewing surface of the liquid crystal display device) of the light-guide plate, configurations such as shown in FIGS. 9A and 9B (described previously), can be adopted as appropriate. In FIGS. 9A and 9B, the bottom (second principal) surface of the light-guide plate 610 is inclined with respect to horizontal and can reflect light to upward. Or, as another alternate example, white-light can be obtained from the light-extraction surface of the backlight unit 1400 shown in the schematic cross-section of FIG. 23. As shown in FIG. 23, in the case where green LD devices 1431 are disposed on an edge (for edge-lighting) and blue LED devices 1421 are disposed on the bottom surface (for direct backlighting). the blue LED devices 1421 can be covered by dome shaped lenses 1429, light emitted by the green LD devices 1431 can emit to the dome shaped lenses 1429, and light can be reflected upward to the light-extraction surface of the light-guide plate 1410. In this structure, white-light illumination from the light-extraction surface can be obtained with a phosphor sheet 1440 disposed on top of the light-guide plate 1410.

Seventh Embodiment

Figure 24:
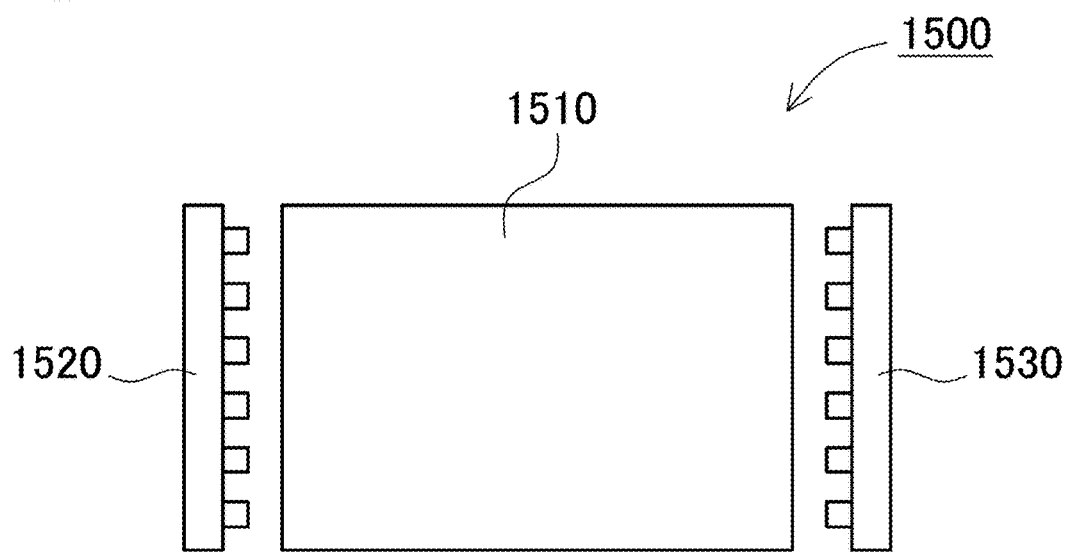
FIG. 24 is a schematic plan view showing backlight unit according to the seventh embodiment.

In the previously described embodiment of FIGS. 1, 2 and 3, LEDs and LDs are disposed on the first and second edges which are substantially orthogonal to each other of the rectangular light-guide plate (as viewed in a plan view), but as shown in the backlight unit 1500 for the seventh embodiment in FIG. 24, a blue LED unit 1520 and green LD unit 1530 can also be provided on respective opposite edges of the light-guide plate 1510. For example, a dedicated light-guide plate for blue LED devices and a dedicated light-guide plate for green LD devices can be prepared separately, blue LED devices and green LD devices can be disposed on opposite edges of each respective light-guide plate, and a stack of those structure can produce color mixed light in the white-light category. Or alternatively, a single light-guide plate can be partitioned in the thickness direction to form a two layer structure, blue LED devices can be disposed on an edge of one layer, and green LD devices can be disposed on the opposite edge of the other layer.

Eighth Embodiment

Figure 25:
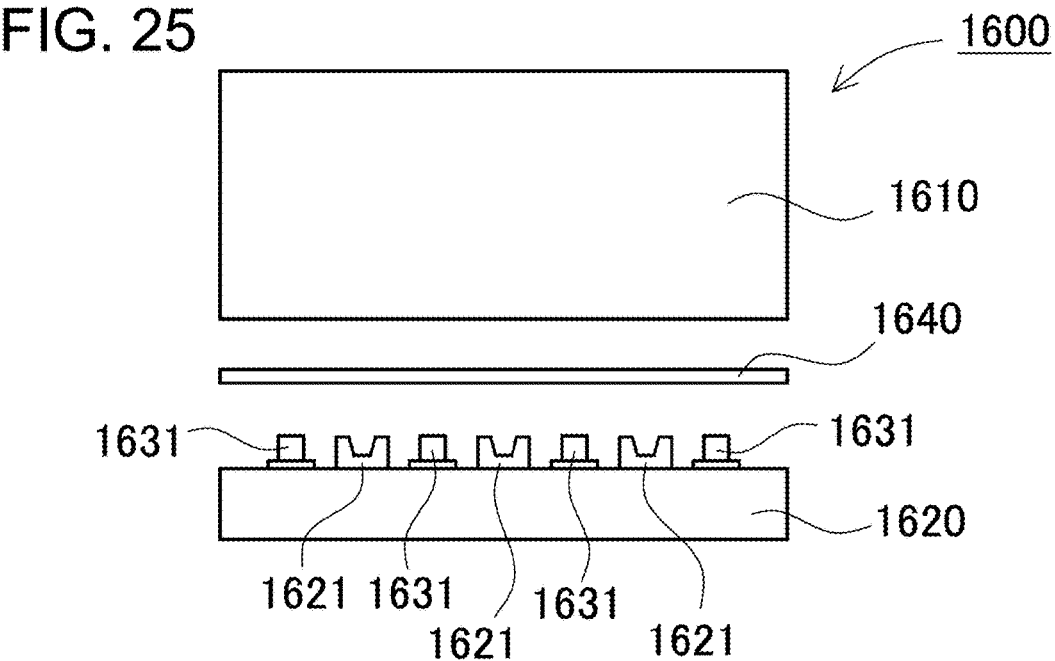
FIG. 25 is a schematic plan view showing backlight unit according to the eighth embodiment.
Figure 26:
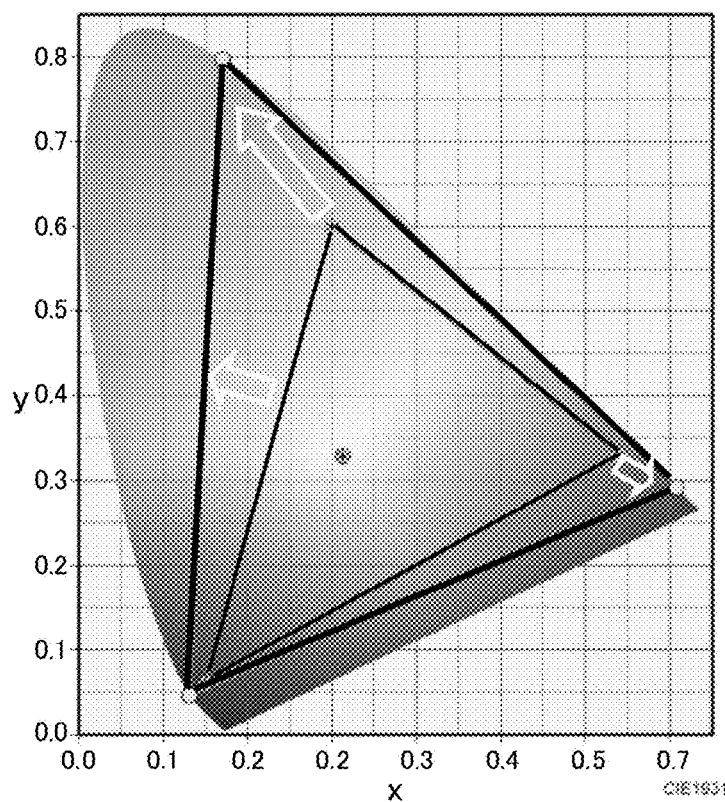
FIG. 26 is a chromaticity diagram showing color-space for NTSC and BT.2020 standards.

In preceding embodiments, blue LED and green LD units are disposed as separate units in different locations, but a structure that integrates the blue LED unit and green LD unit into a single unit is also possible. An example of this type is shown in FIG. 25 as the eighth embodiment. In the backlight unit 1600 of this embodiment a light emitting unit 1620 is disposed on one edge (i.e. the incident light edge) of the light-guide plate 1610. In addition, a phosphor sheet 1640 is disposed between the light emitting unit 1620 and the light-guide plate 1610.

The light emitting unit 1620 has green LD devices 1631 and blue LED devices 1621 mounted alternately in a row. That is, green LD devices 1631 and blue LED devices 1621 are alternately disposed on the second edge of the light-guide plate. While this arrangement disposes light emitting devices closely together, some distance is established between adjacent green LD devices 1631 and thermal effects of one green LD device on another green LD device can be reduced. Further, by concentrating all the heat generating devices (i.e. the green LD devices 1631 and blue LED devices 1621) in a single light emitting unit 1620, heat dissipating function can also be concentrated in the light emitting unit 1620 contributing to reduction in the number parts and parts-cost as well as reduction of overall size of the backlight unit. Phosphor in the phosphor sheet 1640 converts blue light from the blue LED devices 1621 to red light, and can also serve as light scattering material to effectively scatter green light from the green LD devices 1631.

By color mixing blue light, red light, and green light, a unit according to the present disclosure can be used as the light source for a liquid crystal display device, which is capable to emit white light. The light source for liquid crystal display device may include with a plurality of blue light emitting diodes, red phosphor that emits red light when excited by blue light from the blue light emitting diodes, and a plurality of green semiconductor lasers having a green emission peak.

The liquid crystal display backlight unit and liquid crystal display device according to the present embodiment can be used advantageously in transmission-mode liquid crystal display devices that enable multi-color or full-color rendering such as television sets, desk top computer monitors, notebook computer monitors, digital camera display screens, and navigation system display screens.

Implementation of the liquid crystal display backlight unit of the present embodiment enables a wider range of colors to be reproduced compared to prior-art liquid crystal display backlight units employing blue LEDs and yellow phosphor.

What is claimed is:
1. A backlight unit comprising:
a light-guide plate having a first principal plane, a second principal plane at opposite side of the first principal plane, and
at least one edge; and a light source optically coupled with the light-guide plate, with which light is input from a plane of the light-guide plate and white-light is output from the first principal plane of the light-guide plate,
wherein the light source comprises
a plurality of blue light emitting diodes;
red phosphor material excited by light from the blue light emitting diodes and emits red light; and
a plurality of green semiconductor lasers having emission peaks at green light wavelengths, and
wherein the red phosphor material is included in a phosphor sheet, and the phosphor sheet is disposed on a surface of the first principal plane of the light-guide plate;
wherein the green semiconductor lasers are disposed in a row, an end green semiconductor laser which positioned on the end of the row is inclined with respect to other green semiconductor lasers to emit green light in a direction that spreads light from the inside of the light-guide plate towards the outside.

2. The backlight unit according to claim 1,
wherein the light-guide plate has a substantially rectangular shape in a plan view, the blue light emitting diodes are disposed at a first edge of the light-guide plate, and the green semiconductor lasers are disposed at a second edge, which meets at a right angle with the first edge.

3. The backlight unit according to claim 1, wherein the green semiconductor lasers are disposed at opposing a first and a third edges of the light-guide plate, and a beam-axis of each of the green semiconductor lasers is parallel to, and offset from the beam-axis of each of the green semiconductor lasers disposed at the opposing edge.

4. The backlight unit according to claim 1, wherein the light-guide plate has a substantially rectangular shape in a plan view and has a first edge and a second edge, the green semiconductor lasers are disposed at the second edge of the light-guide plate, and the blue light emitting diodes are disposed on the second principal plane of the light-guide plate.

5. The backlight unit according to claim 1, wherein the light-guide plate has a reflecting edge opposite an incident edge, which is where incident light emits from the green semiconductor lasers, the reflecting edge reflects the incident light input from the incident edge back into the light-guide plate.

6. The backlight unit according to claim 1, wherein the light-guide plate has a substantially rectangular shape in a plan view, and the blue light emitting diodes and the green semiconductor lasers are disposed in an alternating manner at a first edge of the light-guide plate.

* * * * *